United States Patent [19]
Souza

[11] Patent Number: 5,817,231
[45] Date of Patent: Oct. 6, 1998

[54] WATER PURIFYING AND VENDING APPARATUS

[75] Inventor: William J. Souza, Fall River, Mass.

[73] Assignee: American Dryer Corporation, Fall River, Mass.

[21] Appl. No.: 770,302

[22] Filed: Dec. 20, 1996

[51] Int. Cl.[6] .................................................. B01D 36/00
[52] U.S. Cl. ........................ 210/96.2; 210/104; 210/109; 210/138; 210/196; 210/257.2; 210/260; 210/264; 422/186.3; 222/189.06
[58] Field of Search .................................. 422/24, 186.3; 222/63, 189.06, 639, 644; 210/96.1, 96.2, 104, 109, 134, 137, 138, 195.1, 196, 257.1, 257.2, 258, 260, 264

[56] References Cited

U.S. PATENT DOCUMENTS

| | | |
|---|---|---|
| 3,787,659 | 1/1974 | Olland . |
| 3,856,676 | 12/1974 | Grimme, Jr. et al. . |
| 4,623,467 | 11/1986 | Hamlin . |
| 4,784,763 | 11/1988 | Hambleton et al. .................... 210/96.2 |
| 4,801,375 | 1/1989 | Padilla . |
| 4,969,991 | 11/1990 | Valadez ................................... 210/96.2 |
| 5,056,334 | 10/1991 | Hooper et al. ............................. 62/320 |
| 5,071,041 | 12/1991 | Garbe . |
| 5,108,590 | 4/1992 | DiSanto . |
| 5,443,739 | 8/1995 | Vogel et al. .......................... 210/257.2 |
| 5,457,767 | 10/1995 | Frank . |
| 5,502,978 | 4/1996 | Field ...................................... 222/146.6 |
| 5,651,887 | 7/1997 | Posner et al. ............................ 210/340 |

Primary Examiner—W. L. Walker
Attorney, Agent, or Firm—Pollock Vande Sande & Priddy

[57] ABSTRACT

A water purification apparatus for purifying input water and dispensing a user selected quantity of purified water into a portable container in response to deposit of a predetermined amount of money. The apparatus comprises a first purified water path and a second purified water path. The first purified water path includes a reverse osmosis filter and a storage tank. The second purified water path includes an ultraviolet sterilizing unit connected between the tank and a dispensing unit with one or more dispensing valves. A recirculation water path periodically recirculates tank water through the ultraviolet sterilizing apparatus to improve and maintain the purity thereof. Another water recirculation path may be provided to recirculate concentrate from the reverse osmosis filter to a filter inlet line where it is mixed with input water.

16 Claims, 20 Drawing Sheets

WATER PURIFYING AND VENDING APPARATUS

FIELD OF THE INVENTION

The present invention relates to water purifying and vending machines, and more particularly to such an apparatus for dispensing water which has been purified by removing undesirable minerals, organic materials and microorganisms.

BACKGROUND OF THE INVENTION

Many types of water vending machines are commercially available in the prior art and some of these machines include reverse osmosis filters for removing dissolved solids and ultraviolet disinfecting units for killing microorganisms. These machines generally involve a coin operated vending apparatus for dispensing purified water into a portable container. The raw input water generally comes from a well or municipal water system, and the machine purifies this water by removing dissolved solids, microorganisms and other impurities.

However, a need still exists for a system which will convert the input water to a higher quality of purified drinking water, and which accomplishes this conversion using relatively inexpensive and reliable filtering components. A need also exists for periodically treating such purified water to maintain its purity until it is dispensed after a relatively long period of time, which conserves water by avoiding the need to dump stored water that may have become contaminated in the interim between vending operations.

SUMMARY OF THE INVENTION

Accordingly, a principal object of the present invention is to provide a pure water vending apparatus of improved construction that is capable of providing, storing and maintaining the purity of purified water for relatively long periods of time, and of dispensing stored water of high quality without the need to periodically dump the stored water to ensure this quality.

Another object of the present invention is to recirculate at least a portion of the concentrate from a reverse osmosis filter and to mix this recirculated concentrate with a partially filtered water flow to the reverse osmosis filter, thereby conserving water by reducing the amount of concentrate discharged to drain.

These and other objects are achieved by the present invention which provides a coin-operated vending apparatus for dispensing selected quantities of purified water into portable containers. Supply means connects the apparatus to a source of input water to be purified, and a first purifying means purifies the input water and conveys this first purified water to a tank means. A second purifying means further purifies the first purified water to provide second purified water and conveys the second purified water to a dispensing means for dispensing this high purity water into a portable container for consumption by a human being.

Recirculation means is connected between the second purifying means and the tank means for recirculating the second purified water from an outlet to an inlet of the tank means. Control means causes the second purified water to be recirculated periodically from the tank outlet to the tank inlet by the recirculation means. Such recirculation may also be provided to reduce pressure transients when at least one purified water dispensing valve is in its open position.

The first purifying means comprises a reverse osmosis filter for separating inlet water into a permeate containing a reduced amount of dissolved solids relative to the input water and a concentrate containing an increased amount of dissolved solids relative to the input water. Inlet means provides a flow of input water to the reverse osmosis filter means, and a concentrate outlet means is connected to a wastewater conduit for discharging the concentrate to ambient. In an optional embodiment of the invention, a second recirculation means is connected between the concentrate outlet means and the inlet means of the reverse osmosis filter for recirculating at least a portion of the concentrate to the inlet means in order to conserve the amount of water that might otherwise be discharged to ambient through the wastewater conduit.

The dispensing apparatus of the invention also comprises control means responsive to a monetary input and a keypad input for dispensing a selected quantity of purified water corresponding to the keypad input and depending on deposit of the corresponding monetary amount. The control means may comprise a microprocessor and sensing means connected to the microprocessor for providing inputs indicative of the operating condition of individual components in the first and second purifying means. The microprocessor may be programmed to terminate water dispensing operations and place the dispensing apparatus in an "out-of-order" mode in response to a sensed condition indicating improper operation of one or more of the purifying components.

BRIEF DESCRIPTION OF THE DRAWINGS

The construction and operation of the dispensing apparatus of the invention may be further understood and appreciated from the detailed description set forth below taken in conjunction with the accompanying drawings, in which.

DETAILED DESCRIPTION OF THE INVENTION

Figure 1:
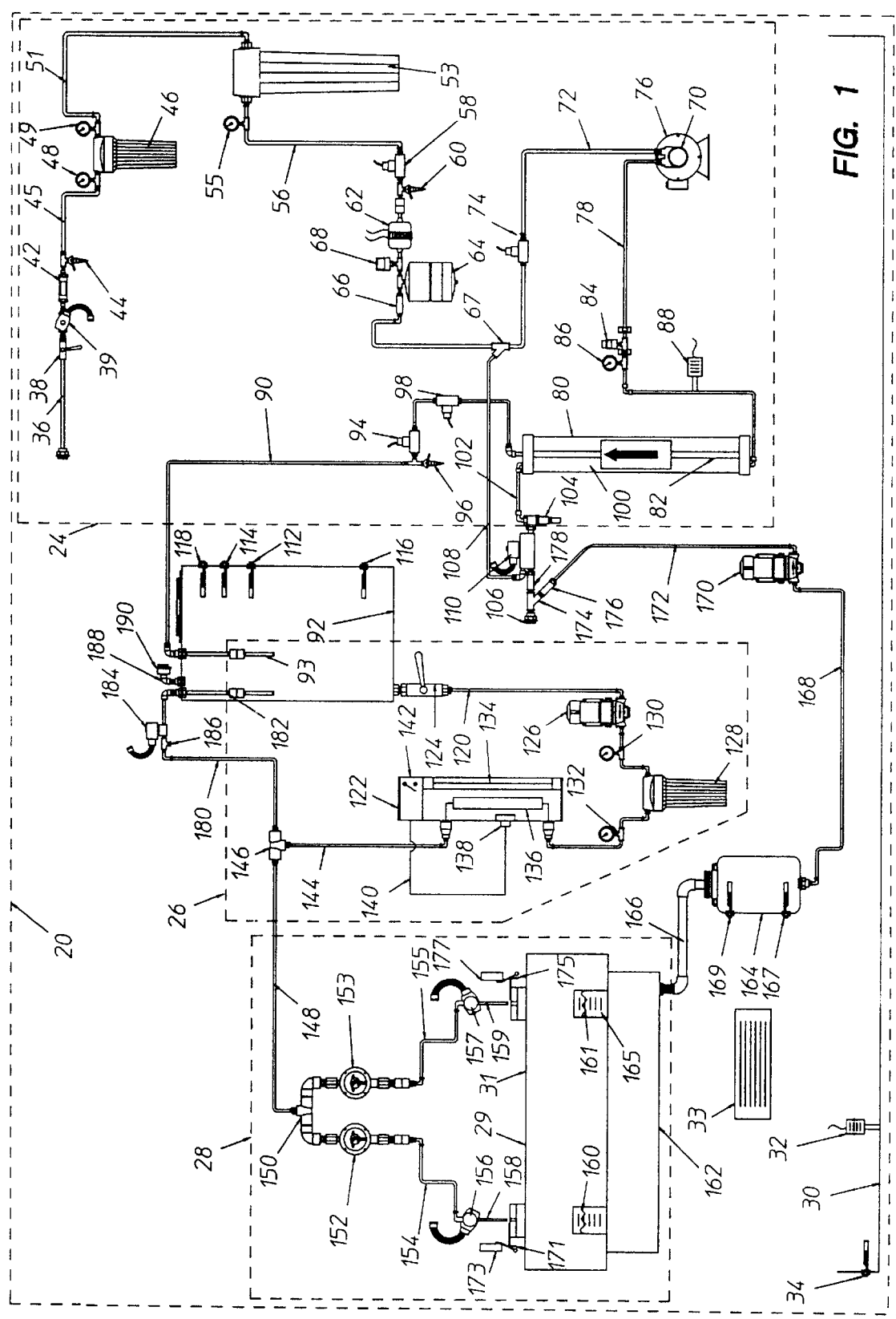
FIG. 1 is a schematic diagram of the fluid systems and of the major components of the invention, and includes the sensing elements for monitoring operation of the major components.

As shown in FIG. 1, the dispensing apparatus 20 of the present invention includes a first water purifying means 24, a second water purifying means 26 and a purified water dispensing means 28 housing within a cabinet (not shown) having a water tight base 30. The internal temperature of the cabinet is measured by a temperature sensor 32, and under freezing conditions the cabinet temperature is maintained by a cabinet heater 33. Any water leaking into the base 30 of the cabinet is detected by a base water level switch 34, actuation of which shuts down the apparatus 20 by putting it in its "out-of-order" mode.

The apparatus 20 is connected to an inlet water supply (not shown) by an inlet line 36 containing a manual shut-off valve 38, a remotely operable inlet solenoid valve 39, a check valve 42 for preventing back flow, and a water cock 44 for obtaining samples for testing inlet water quality. A water line 45 downstream of cock 44 contains a sediment filter 46 for removing suspended solids in the inlet water. An inlet pressure transducer 48 and an outlet pressure transducer 49 are provided for measuring the differential pressure across filter 46 and thereby detecting when the cartridge of this filter should be replaced.

In a water line 51 downstream of sediment filter 46 is a carbon filter 53 for removing dissolved chemical contaminants from the input water, and the time for replacing the cartridge of this filter is determined by measuring the differential pressure across the upstream pressure transducer 49 and a downstream pressure transducer 55 in a water line 56. Line 56 also contains an inlet water conductivity test cell 58, a sampling water cock 60, an inlet water flow meter 62, a pressure surge tank 64, a back flow preventing check valve 66, and a low pressure switch 68 for providing low pressure protection to an electric water pump 70, which is referred to as an R.O. pump and the inlet of which is connected to the check valve 66 by a water line 72. Switch 68 is a normally open switch that is closed when the system is operating properly, namely when the switch is kept closed by sufficient inlet pressure to the pump 70. Line 72 may also contain an optional conductivity test cell 74, the purpose of which is described below. Pump 70, for example, may be rated at 240 gallons per hour (gph), or 40 gallons per minute (gpm), and driven by a three-quarter horsepower electric motor 76.

The outlet of pump 70 is connected by a water line 78 to the inlet of a reverse osmosis filter 80 containing a semi-permeable membrane 82. A reverse osmosis filter of this type may be of conventional design, such as the filters described in U.S. Pat. Nos. 3,856,676 to Grimme, et al., No. 4,623,467 to Hamlin, and No. 4,801,375 to Padilla, the entire contents of these patents being expressly incorporated herein by reference. Line 78 also contains a high pressure switch 84, a pressure transducer 86, and a water temperature sensor 88. Switch 84 is a normally closed switch when the system is working properly.

The pressure transducers 48, 49, 55 and 86, and the water pressure switches 68 and 84, are connected to control means to provide continual monitoring of the pressure drop across the filters 46 and 53, and if this pressure drop indicates a clogged filter cartridge, the control means identifies which filter cartridge is in need of replacement and prevents operation of the pump 70. Similarly, the operation of pump 70 is prevented if the low pressure switch 68 indicates an abnormally low pressure.

Referring now the reverse osmosis filter 80, the inlet water to be treated is delivered to a concentrate chamber 100 on the outside of the membrane 82, and the inside of the membrane 82 communicates with a permeate water line 90 for delivering first purified water to a holding tank 92 through a tank inlet 93. Line 90 contains a permeate water conductivity cell 94 and a water test cock 96, and may optionally contain a second water conductivity sensor 98, the purpose of which is described below.

The concentrate chamber 100 outside of membrane 82 conveys the rejected water into a concentrate line 102, the rejected water being that portion of the input water that does not pass through the membrane 82. The membrane 82 that is preferably selected is of the thin film composite type and provides a range of chemical rejections based on the exact chemistry, temperature and pressure of the inlet water fed to the membrane. Preferably, the conductivity of the inlet water must be at least 85% more conductive than the permeate entering the tank or the control means will shut the system down and initiate an "Out of Order" mode. The rejected water or "concentrate" contains increased amounts of dissolved solids, such as dissolved minerals, bacteria and other organic materials, and chemical pollutants in the form of dissolved solids. By comparison, the permeate inside the membrane 82 contains substantially reduced amounts of such dissolved solids, this being determined on the basis of the total dissolved solids (TDS) content of the permeate.

The water supplied to the inlet of osmosis filter 80 by line 78 is under relatively high pressure, as for example, a pressure of about 165 pounds per square inch gauge (psig). The rejected water and impurities in the form of "concentrate" are delivered from chamber 100 to a discharge line 102 containing an adjustable pressure regulator 104 for maintaining the desired back pressure within the osmosis filter 80. The concentrate released by the pressure regulator 104 may flow either to a wastewater drain, sewer or the like through a drain outlet 106, or at least a portion of the concentrate may optionally be recirculated through a recirculation line 108 connected to the water line 72 at a tee 67 upstream of the inlet to pump 70. The line 108 contains a three-way solenoid control valve 110 for controlling the proportion of the concentrate that is recirculated relative to the proportion that is sent to drain outlet 106. Preferably, all concentrate is recirculated during normal refilling of the holding tank 92, and none is recirculated at selected times during the purge and yield routines.

The purpose of the optional conductivity sensors 74 and 98 are to monitor the level of dissolved solids in the permeate relative to the level of dissolved solids being feed to the osmosis filter 80 while concentrate is being recirculated through the line 108. Although the conductivity sensors 94 and 98 may be combined into a single conductivity sensor of adequate range, two such sensors as shown may be preferable where the range of TDS in the permeate without concentrate recirculation is substantially different from the range of TDS in the permeate when recirculation is deemed desirable to conserve the amount of water discharged to drain.

The holding tank 92 for holding permeate water includes a fill water level sensor 112 (fill level switch) for adding water to the tank by causing valve 39 to open and pump 70 to run, and a high water level sensor 114 (high level switch) for causing valve 39 to close and pump 70 to stop. The control system to which these sensors are connected also receives an input from water meter 62 so that the total water consumed is measured and recorded. The flow rate is also measured by meter 62 and may be compared with the maximum normal time period for increasing the water level from that of sensor 112 to that of sensor 114. Periodically, the membrane's yield is checked and compared against the recorded initial conditions. A time period exceeding 17% of this normal maximum indicates that the membrane 82 of the osmosis filter 80 is fouled and is in need of cleaning or replacement. This indication causes the system to be shut down and placed in an out-of-order mode. The holding tank 92 also includes a low water level sensor 116, which places the unit temporarily in a condition that locks out customers while the system refills enough for further vending. An overflow water level sensor 118 (tank over fill switch) may provide a control system input for placing the system in its out-of-order mode.

The tank over fill switch 118 is used to deactivate valves and pumps during a failure of the high level switch 114 and/or inlet water valve 39. It is also used to set the unit in its out-of-order mode and to activate an auxiliary safety output 225 (FIG. 2) for causing closure of an optional safety shutoff valve in the water main (not shown) to which the inlet line 36 is connected. The fill level switch 112 is used to determine when the tank needs to be filled, as well as providing an initial reference point to determine permeate yield. This switch will initiate a tank fill when activated. The high level switch 114 is used to determine when the tank has filled, as well as providing a final reference point to determine permeate yield. This switch will stop the tank fill when de-activated. The low level switch 116 is used to allow the microprocessor to refund money to customers and to prompt the user to please wait for the refilling of the tank during normal operation. This switch is also used as part of the system purge routine and the flush routine to determine the volume status of the tank.

The preferred method of keeping holding tank 92 supplied with water is to use a bulk fill of the tank as opposed to refilling the tank every time a user selected amount of water is dispensed by the unit 20. The use of a bulk fill reduces utility costs as well as providing better water quality. Better water quality is achieved because of a characteristic of the membrane 82 wherein every time osmosis filter 80 depressurizes, membrane 82 relaxes and allows water on opposites of the membrane to mix internally within the membrane housing. This causes a spike of a higher concentration of TDS on the permeate side of the membrane each time an operating pressure is re-applied to the membrane by activation of pump 76. Accordingly, refilling tank 92 each time a gallon of water is dispensed would cause such a spike for every gallon of water added to the tank. On the other hand, a bulk fill of the tank to raise the water level from fill level switch 112 to high level switch 114 produces only one such spike at the initiation of this bulk fill. It is therefore preferred that switches 112 and 114 be spaced vertically apart by a distance sufficient to provide a bulk fill of at least 10 gallons at a time. It is also preferred that the capacity of tank 92 be at least 55 gallons so that the small portion of water containing the TDS spike will be diluted with a much larger volume of water being maintained in the tank.

A permeate water discharge line 120 connects an outlet of the permeate tank 92 to an ultraviolet light (U.V.) sterilizing unit 122. Line 120 contains a manual shut-off valve 124, a dispensing pump 126, and a carbon polishing filter 128. The time for replacing the cartridge of filter 128 is determined by the differential pressure across this filter as measured by an inlet pressure transducer 130 and an outlet pressure transducer 132. An excessive pressure differential detected by transducers 130 and 132 shuts down the system in response to a clogged filter cartridge or other fault in the operation of polishing filter 128. A pressure switch connected between the inlet and the outlet of each of the filters 46, 53, and 128 may be used in place of the respective transducer pairs 48/49, 49/55 and 130/132.

The U.V. sterilization unit 122 contains an ultraviolet lamp 134, which irradiates a transparent water conduit section 136 with sufficient ultraviolet light to kill substantially all, or nearly all, bacteria, viruses and other microorganisms in the permeate water from tank 92 prior to its being dispensed as the purified water product of the apparatus 20. The U.V. light unit 122 may be of conventional construction, such as described in U.S. Pat. Nos. 4,623,467 and No. 4,801,375 referred to hereinabove.

A U.V. light sensor 138, which is on the opposite side of transparent conduit 136 from the lamp 134, sends a signal over an electrical line 140 to maintain in a closed condition a switch in an alarm module 142. If the intensity of the U.V. light from the lamp 134 falls below a predetermined value, this normally closed switch opens and causes alarm module 142 to actuate a relay interlock (not shown), which shuts down the system by stopping the pumping of permeate to the tank 92 by the pump 70 and places the apparatus 20 in its out-of-order mode. The relay interlock remains active until the intensity of the U.V. light is increased to a preset value, which may require replacement of the U.V. lamp 134. The sterilization unit 122 is located immediately upstream of the dispensing means 28 so that all microorganisms in the vended water will be killed just prior to the entry of this water into the dispensing means.

Sterilization unit 122 is connected to the dispensing means 28 by a sterilized water line 144, a tee 146, and a product water line 148. The dispensing means 28 comprises a second tee 150 for dividing product water flow into dual dispensing flow paths, one to a left bay 29 and the other to a right bay 31. The left bay flow path contains a flow meter 152, a dispensing line 154, a solenoid dispensing valve 156, and a dispensing nozzle 158. The right bay flow path contains a flow meter 153, a dispensing line 155, a solenoid dispensing valve 157, and a dispensing nozzle 159.

To protect the nozzles 158 and 159 from contamination or tampering when not in use, there may be provided a horizontally sliding trap door 171 for left bay 29 and a horizontally sliding trap door 175 for right bay 31, each trap door having a closed position beneath the corresponding nozzle as shown by broken lines and a retracted open position as shown by full lines in FIG. 1. The open position of the doors 171 and 175 are detected by respective switches 173 and 177. Also illustrated is a left portable container 160 and a right portable container 161 for receiving purified water product as dispensed in the respective left and right bays 29 and 31.

Any spillage or overflow from the containers 160 and 161 is caught in a water tight bay pan 162, which is connected to a drain reservoir 164 by a drain pipe 166. The drain reservoir includes a drain switch 167 for actuating drain pump 170 and a bay overflow switch 169 for detecting faulty operation of the drain pump 170, which causes a shut down of the system. Drain reservoir 164 is connected by a drain line 168 to a drain pump 170, which in turn is connected to the drain outlet 106 by a drain line 172 and a "y" tee 174. Upstream of the inlet branches of tee 174 are check valves 176 and 178.

In order to sterilize the permeate water in tank 92, there is provided a recirculation line 180 that connects an outlet of tee 146 to a second tank inlet 182, and contains a solenoid recirculation valve 184 for opening and closing recirculation line 180 and a needle valve 186 for manually adjusting the rate of recirculation flow when either one of the dispensing valves 156 and 157 is opened while the other remains closed. An air vent line 188 is also provided for venting air from tank 92 as it is filled, and this line contains a biological filter 190 for preventing the entry of biological contaminants when ambient air is sucked into vent line 188 as water is drawn from the tank.

Recirculation line 180 is preferably opened periodically by valve 184 with a frequency and for a time period sufficient to sterilize and maintain the purity of the water within tank 92. By way of example, recirculation valve 184 may be opened and dispensing pump 126 operated every six hours for about 18 minutes, and the capacity of dispensing pump 126 may be selected, such that a holding tank of 55 gallons capacity will have its entire contents recirculated four times each day. With the same capacity pump and recirculation periods, the entire contents of a ninety gallon tank would be recirculated twice each day.

As an optional feature of the invention, the recirculation valve 184 may also be opened during the dispensing of water by the dispensing means 28 so as to reduce pressure transients caused by actuation of the dispensing pump 126 and/or the opening of a dispensing valve. It is particularly preferable to open the recirculation valve 184 when dispensing water through only one of the dispensing pathways because greater pressure transients may occur during such a dispensing operation.

The control system for monitoring the various sensors and controlling operation of the apparatus 20 includes a feature wherein each of the flow meters 152 and 153 may be calibrated by placing the control system in a "teach" mode that compares the flow measurement output of the respective meters with the amount of water actually dispensed to a container having a predetermined capacity or marked with volume indicating indicia, such as indicia 165 on container 161 for measuring the precise amount of water dispensed. The precise amount of water measured is then input into the control system by a keypad and compared with the amount determined by the flow meter being calibrated. This comparison is then used by the control system as the basis for dispensing the exact amount of purified water specified and paid for by the user. The teach mode of the control system is used when setting up the apparatus 20 for initial use, and is also used to recalibrate the system after replacement of either one or both of the flow meters 152 and 153.

Figure 2:
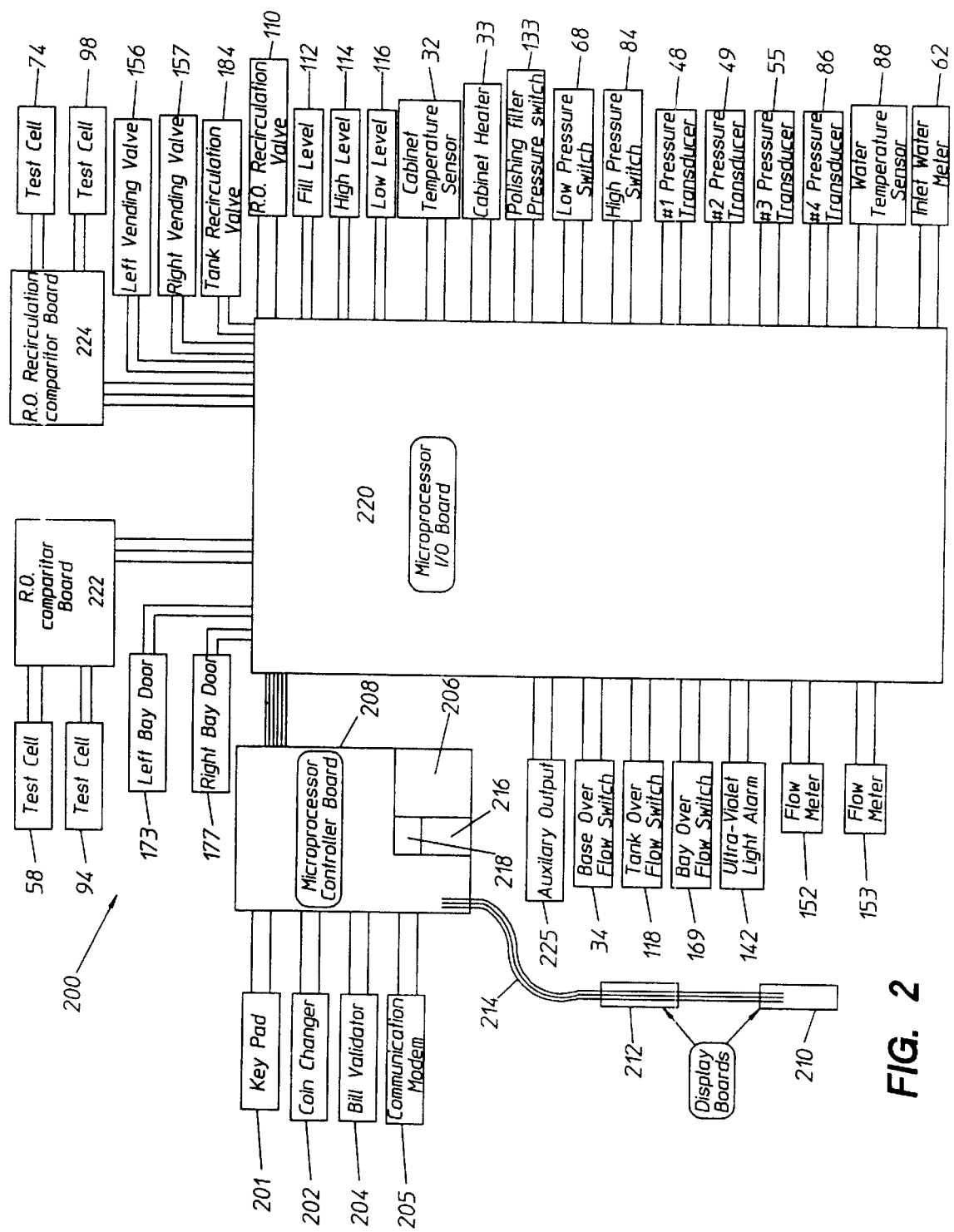
FIG. 2 is schematic diagram of the major components of the control system of the invention, and illustrates the various inputs to the microprocessor for monitoring and controlling the fluid system components of FIG. 1; and, FIGS. 3–20 are diagrams of the logic for operation of the fluid systems of FIG. 1 under the control of the microprocessor of FIG. 2, and these diagrams are to be viewed sequentially from FIG. 3 through FIG. 20.

Referring now to FIG. 2, there is shown a preferred embodiment of the control means or system 200 for monitoring and operating the above described components of the water dispensing apparatus 20. A keypad 201, a coin changer 202, a bill validator 204 and a communication modem 205 are electrically connected to a microprocessor 206 via a microprocessor controller board 208. Modem 205 permits communication over telephone lines between a remote central computer (not shown) and the microprocessor 206 so that the various sensor inputs may be polled remotely to evaluate the performance of the unit 20, to permit data stored by the microprocessor to be transmitted to a central location for analysis, and/or to activate a remote alarm indicating that the unit 20 requires service.

A right water dispensing display board 210 and a left water dispensing display board 212 are also electrically connected to the controller board 208 by a ribbon cable 214. The displays 210 and 212 may include high intensity LED's for displaying the amount of water to be dispensed relative to the amount of money deposited, and also various programming features actuated in response to predetermined inputs from the keypad 201. The operating system and programming for microprocessor 206 are stored in a ROM 216 and run in a RAM 218 in a conventional manner.

Also electrically connected to the microprocessor controller board 208 is a microprocessor inlet/outlet (I/O) board 220, which may be of the multiplexing type for periodically monitoring a plurality of sensor outputs. Thus, inputted to the I/O board are outputs from cabinet temperature sensor 32, polishing filter pressure switch 133, low pressure switch 68, high pressure switch 84, pressure transducer 48, pressure transducer 49, pressure transducer 55, pressure transducer 86, water temperature sensor 88, inlet water meter 62, right dispensing flow meter 153, left dispensing flow meter 152, U.V. light alarm 142, bay overflow switch 169, tank overflow switch 118, base overflow switch 34, left bay door switch 173, right bay door switch 177, left dispensing valve 156, right dispensing valve 157, tank recirculation valve 184, low level switch 116, fill level switch 112, high level switch 114, cabinet heater 33, and the external modem 205.

Inputs to the I/O board 220 are also outputted by an R.O. comparator board 222 which compares the conductivity measured by cell 94 with the conductivity measured by cell 58 to monitor the contaminant removal efficiency of the reverse osmosis (R.O.) filter 80, and by an R.O. recirculation comparator board 224 which compares the conductivity of cell 98 with the conductivity of cell 74 to monitor the contaminant removal efficiency of R.O. filter 80 while concentrate from this filter is being recirculated via line 108 to the pump input line 72.

The auxiliary output 225 may optionally be provided and connected to the microprocessor I/O board 220 as shown in FIG. 2. Auxiliary output 225 may be used to activate or otherwise communicate with equipment associated with the unit 20, but installed outside of the confines of the unit cabinet. For example, a solenoid actuated shutoff valve may be installed in the water main of the indoor plumbing connected to unit line 36 so that this valve is in series with the unit inlet valve 39. This valve then may be used to completely terminate any water flow to the unit when a failure, such as incomplete closure of valve 39, has triggered tank overfill switch 118 or base water level switch 34. Output 225 may also trigger an external audible alarm to indicate when unit 20 requires service, although an internal audible alarm, such as one mounted on the board 220, may be preferable. Also preferably provided is an output from the board 220 to the cabinet heater 33 so that this heater may be actuated by the microprocessor 206 to protect unit 20 from freezing conditions when freezing temperatures are detected by cabinet temperature sensor 32.

Although a preferred embodiment of the control system has been described in the preceding paragraphs, the water dispensing apparatus 20 may be operated with less extensive monitoring and a corresponding reduction in the number of sensor and switch inputs. For example, the concentrate recirculation line 108 and recirculation valve 110 may be eliminated, along with conductivity cells 74 and 98 and the corresponding comparator board 224. There also may be eliminated the cabinet temperature sensor 32, the polishing filter transducers 130 and 132, water temperature sensor 88, and pressure transducers 48, 49, 55 and 86. Other items that may be eliminated include the bay doors 171 and 175 and the corresponding door sensors 173 and 177. The inputs to the I/O board may thus be reduced sufficiently to use a microprocessor I/O board of the interlock type, instead of the more expensive multiplexing type.

FIGS. 3–20 are diagrams which illustrate the programmed logic executed by microprocessor 206 in monitoring and controlling the operation of the water vending apparatus 20. In these figures, a parallelogram box represents a yes and no query that the microprocessor asks of itself and from which a yes or no determination can be made based upon information stored in the RAM 216 or the ROM 218. A rectangular or oval box represents operations effected by the control means of which the microprocessor 206, the RAM 216 and the ROM 218 are a part. These figures are to be read sequentially because the operations represented go from one figure to the next in consecutive order.

Figure 3:
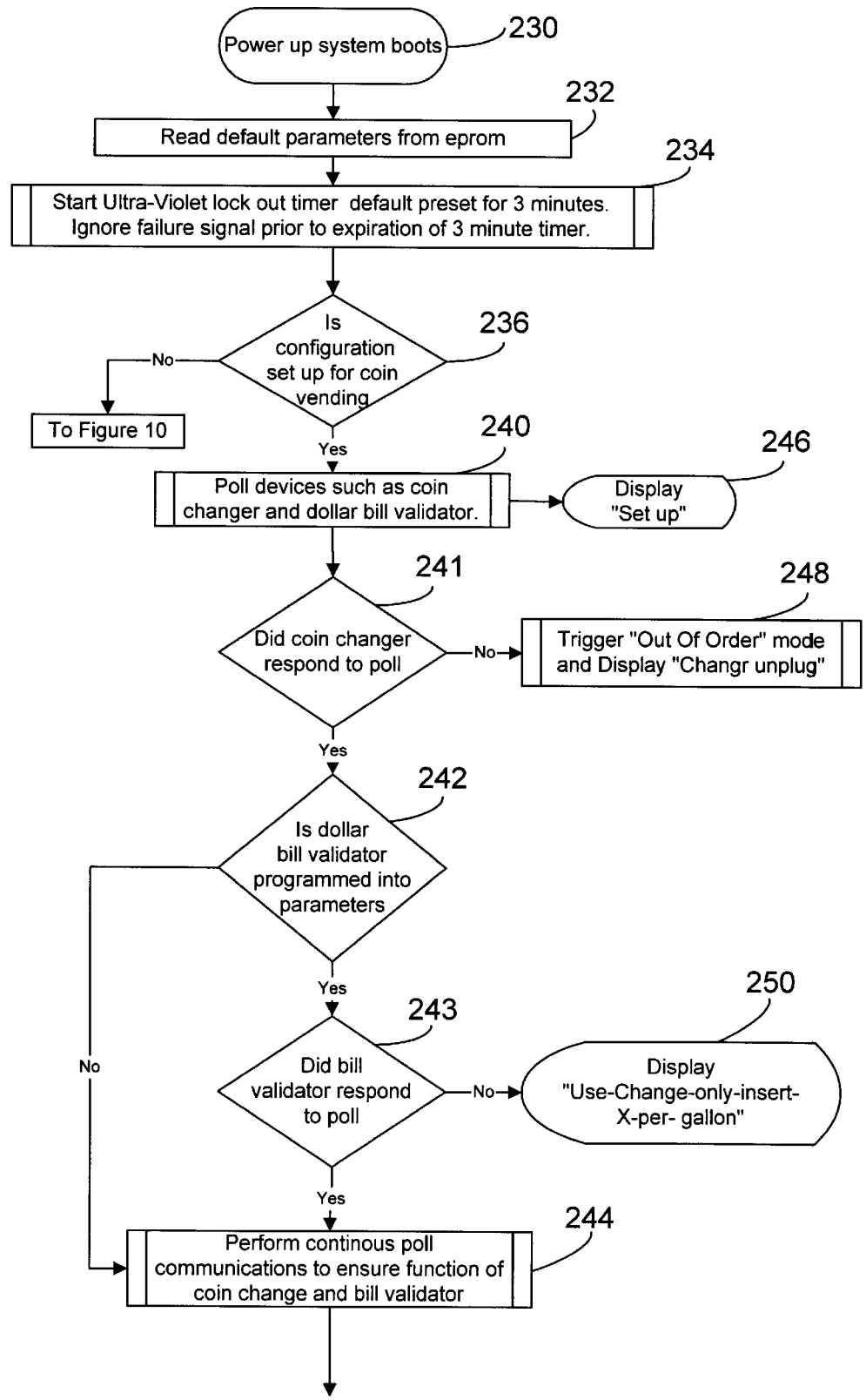

Referring now to FIG. 3, there is shown the initiation of the start-up sequence following installation of the apparatus 20. The control system boots up at 230 and reads the default parameters from the EPROM at 232. Since the ultraviolet unit 122 requires a warm up period of less than three minutes, an ultraviolet lockout timer is preset for three minutes so that the control system will ignore a U.V. failure signal prior to expiration of the three minute timer, as represented by box 234. After three minutes, the control means determines if the system configuration has been set up satisfactorily for coin vending as indicated by box 236.

If the answer is negative, all of the safety sensors are polled as indicated by box 348 in FIG. 10 and described further below. If the answer is positive, the monetary vending devices are polled for satisfactory operation as indicated by boxes 240–244. During this polling process, "set up" is displayed on LED 210 and/or LED 212 as indicated by box 246. Negative responses to the poll by the coin changer and/or the bill validator produce a corresponding message as indicated by boxes 248 and 250.

Figure 4:
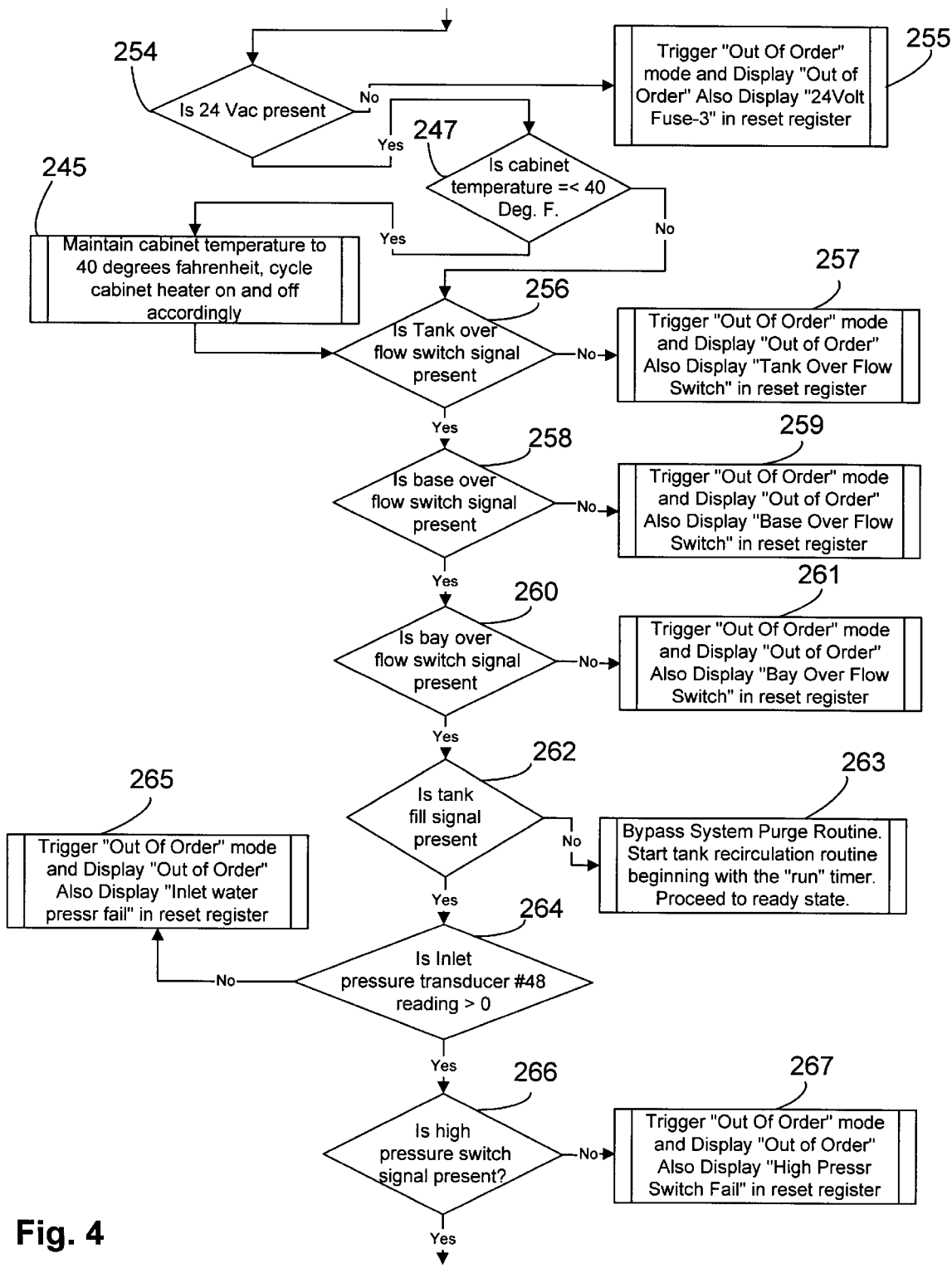

After the dispensing apparatus 20 is set up for coin vending, the control means continuously monitors the sensor inputs related to dispensing safe water. Thus, 24 volts a.c. power is polled at box 254, the cabinet temperature is polled at box 247, the tank overflow switch is polled at box 256, the base overflow switch is polled at box 258, the bay overflow switch is polled at box 260, the inlet pressure transducer is polled at box 264, and the high pressure switch is polled at box 266, all as shown in FIG. 4. If any of these polls (determinations) results in a negative response, the unit 20 is placed in its out-of-order mode and an "Out of Order" message is displayed on LED 210 and/or LED 212 as indicated by boxes 255, 257, 259, 261, 265 and 267, respectively.

As also indicated in boxes 255, 257, 259, 261, 265 and 267, an error message is entered in a reset register (not shown) to identify the faulty component or parameter that triggered the out-of-order mode. These messages are retrievable remotely using the telephone modem 205, or by an on-site repairman using the key pad 201 and the displays 210 and 212. The same display arrangement is applicable to the additional error messages described in the drawings as being "displayed" in the reset register. On the other hand, the "Out of Order" messages are all displayed on LED 210 and/or LED 212 at the time unit 20 is placed in its out-of-order mode.

If the cabinet temperature is below a set point, such as equal to or less than 40° F., the cabinet heater 33 is cycled as indicated by box 245. The tank fill switch (fill level sensor 112) is polled at box 262, and if the tank fill signal is absent, the system purge routine is bypassed, the holding tank water is recirculated and the run timer is started as indicated at box 263. If determination 262 is positive, the process moves to box 264 referred to above.

Figure 5:
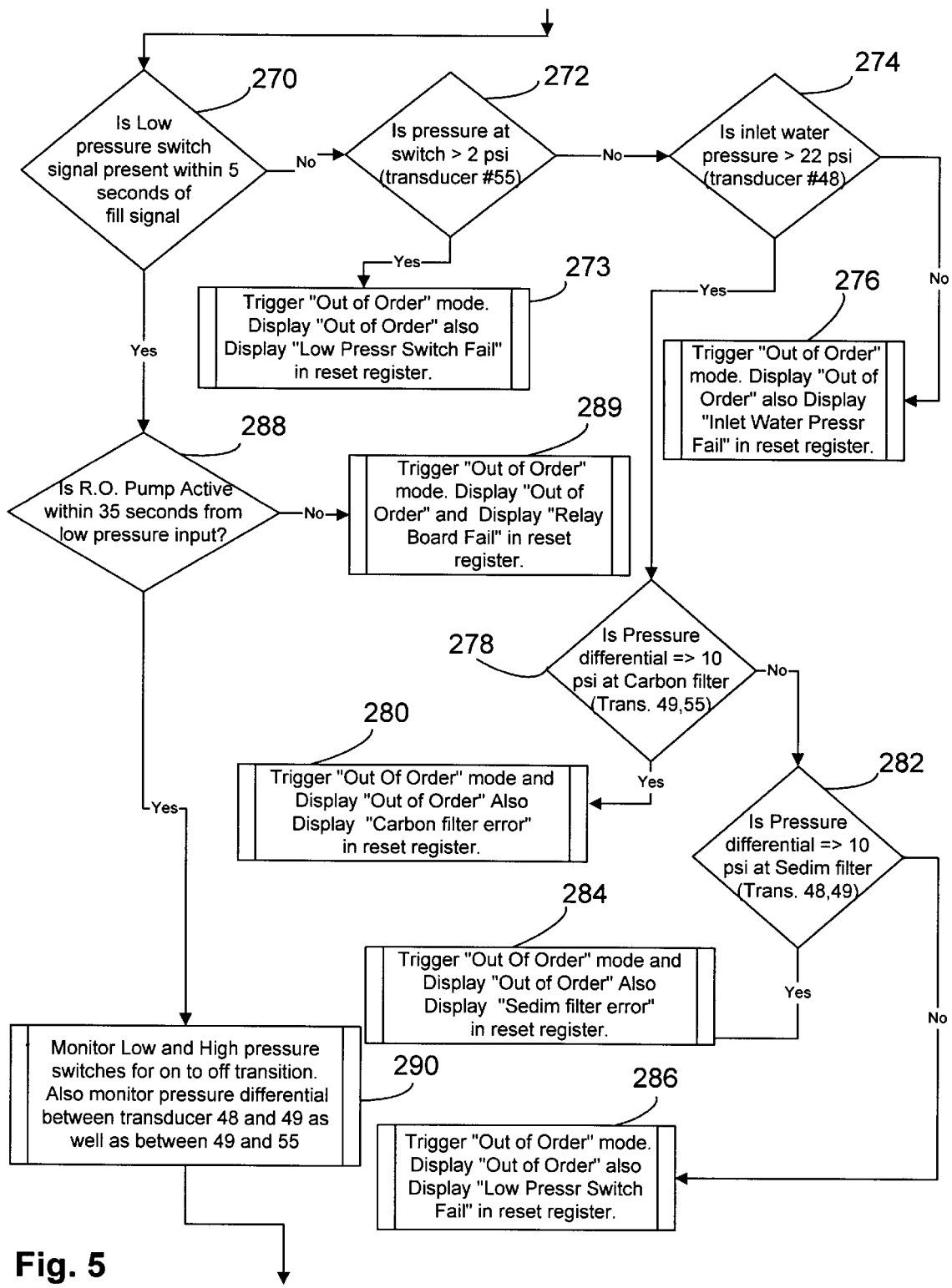

Referring now to FIG. 5, the low pressure switch is polled at 270 to determine if its signal is present within five seconds of the fill signal of box 262. If the response is negative, pressure transducer 55 is polled to determine if it measures a pressure greater than 2.0 psig as indicated by box 272. If this poll is negative, the inlet water pressure at transducer 48 is polled to determine if this pressure is greater than 22 psig as indicated by box 274. If this poll is negative, the unit is placed in its out-of-order mode, and "out-of-order" and "inlet water pressure" failure messages are displayed as indicated by box 276.

If the poll at box 272 is positive, the out-of-order mode is triggered, and "out-of-order" and "low pressure switch failure" messages are displayed as indicated at box 273. If the poll at box 274 is positive, the pressure drop across carbon filter 53, as measured by pressure transducers 49 and 55, is polled to determine if the pressure differential across the carbon filter is equal to or greater than 10 psig as indicated at box 278. If this poll is positive, "out-of-order" and "carbon filter error" messages are displayed, and the unit is placed in its out-of-order mode as indicated at box 280. If the poll 278 is negative, pressure transducers 48 and 49 are polled to determine if the pressure differential across the sediment filter 46 is equal to or greater than 10 psig as indicated by box 282. If this poll is positive, "out-of-order" and "sediment filter error" messages are displayed as indicated by box 284. If poll 282 is negative, "out-of-order" and "low water pressure" messages are displayed as indicated at box 286. Either of these determinations places the unit it its out-of-order mode.

Returning now to poll 270, if this poll is positive, the R.O. pump 70 is polled to determine if it is active within 35 seconds of the low pressure signal as indicated at box 288. A negative response triggers the out-of-order mode, and produces "relay board failure" and "out-or-order" messages as indicated at box 289. A positive poll at box 288, results in monitoring of the low and high pressure switches for on to off transition, and also monitoring of the pressure differentials across the sediment filter 46 and the carbon filter 53, all as indicated at box 290.

Figure 6:
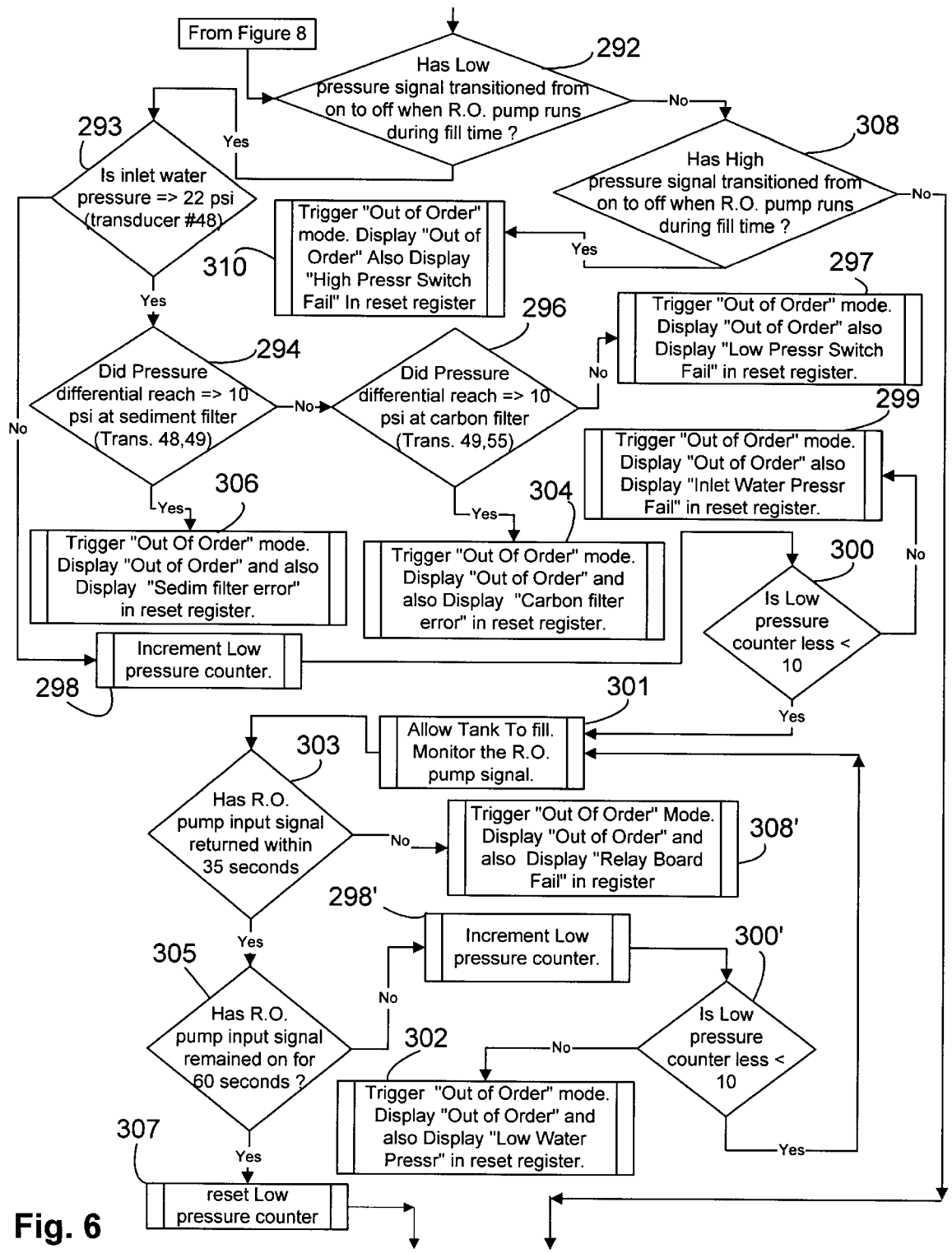

Going now to FIG. 6, a determination is made at box 292 as to whether the low and high pressure switches have transitioned from on to off when R.O. pump 70 runs during the time for filling tank 92. If this poll is positive, transducer 48 is polled to determine if inlet water pressure is greater than or equal to 22 psig as indicated by box 293. If this poll is positive, the pressure differential across sediment filter 53 as measured by transducers 48 and 49 is polled to determine if it is equal to or greater than 10 psig as indicated by box 294. If poll 294 is negative, the pressure differential across the carbon filter, as measured by transducers 49 and 55, is polled to determine if it is 10 psig or greater as indicated by box 296. If the pressure differential across the carbon filter is equal to or greater than 10 psig, the unit is placed in its out-of-order mode, and carbon filter error and out-of-order messages are displayed as indicated at box 304. If the pressure differential across a carbon filter is less than 10 psig, the unit is also placed in its out-of-order mode, and out-of-order and low pressure failure messages are displayed as indicated at box 297. Similarly, if the poll at 294 indicated a differential pressure greater than 10 psig, the out-of-order mode is triggered and "out of order" and "sediment filter error" messages are displayed as indicated at box 306.

If the determination at box 292 was negative, a determination is made as to whether the high pressure signal has transition from on to off while the pump 70 is running and tank 92 is being filled as indicated at box 308. If this determination is positive, the unit is placed in its out-of-order mode, and "out-of-order" and "high pressure switch failure" messages are displayed as indicated at box 310. If the determination at 308 is negative, a system purge is initiated and a "System Purge Do Not Drink" message is displayed as indicated in FIG. 7 by boxes 312 and 314, respectively.

If poll 293 is negative, a low pressure counter is incremented as indicated by box 298 and a determination is made as to whether the low pressure count is less than 10 as indicated by box 300. If this determination is negative, the unit is placed in its out-of-order mode, and "out-of-order" and "inlet water pressure failure" messages are displayed as indicated by box 299. If determination 300 is positive, a tank fill is initiated and the R.O. pump signal is monitored as indicated by box 301. A determination is then made as to whether the R.O. pump input signal has returned within 35 seconds as indicated at box 303. If determination 303 is negative, the unit is placed in its out-of-order mode, and "out-of-order" and "relay board failure" messages are displayed as indicated at box 308'. If determination 303 is positive, a determination is made as to whether the R.O. pump input signal has remained on for 60 seconds as indicated at box 305. If determination 305 is negative, the low pressure counter is incremented as indicated at box 298' and a determination is made as to whether the count of the low pressure counter is less than 10 as indicated at box 300'. If determination 300' is negative, the unit is placed in its out-of-order mode, and "out-of-order" and "low water pressure" messages are displayed as indicated at box 302. If determination 300' is positive, tank fill is again initiated as indicated at box 301. If determination 305 is positive, the low pressure counter is reset as indicated at box 307 and a system purge is initiated as indicated by box 312 in FIG. 7.

Figure 7:
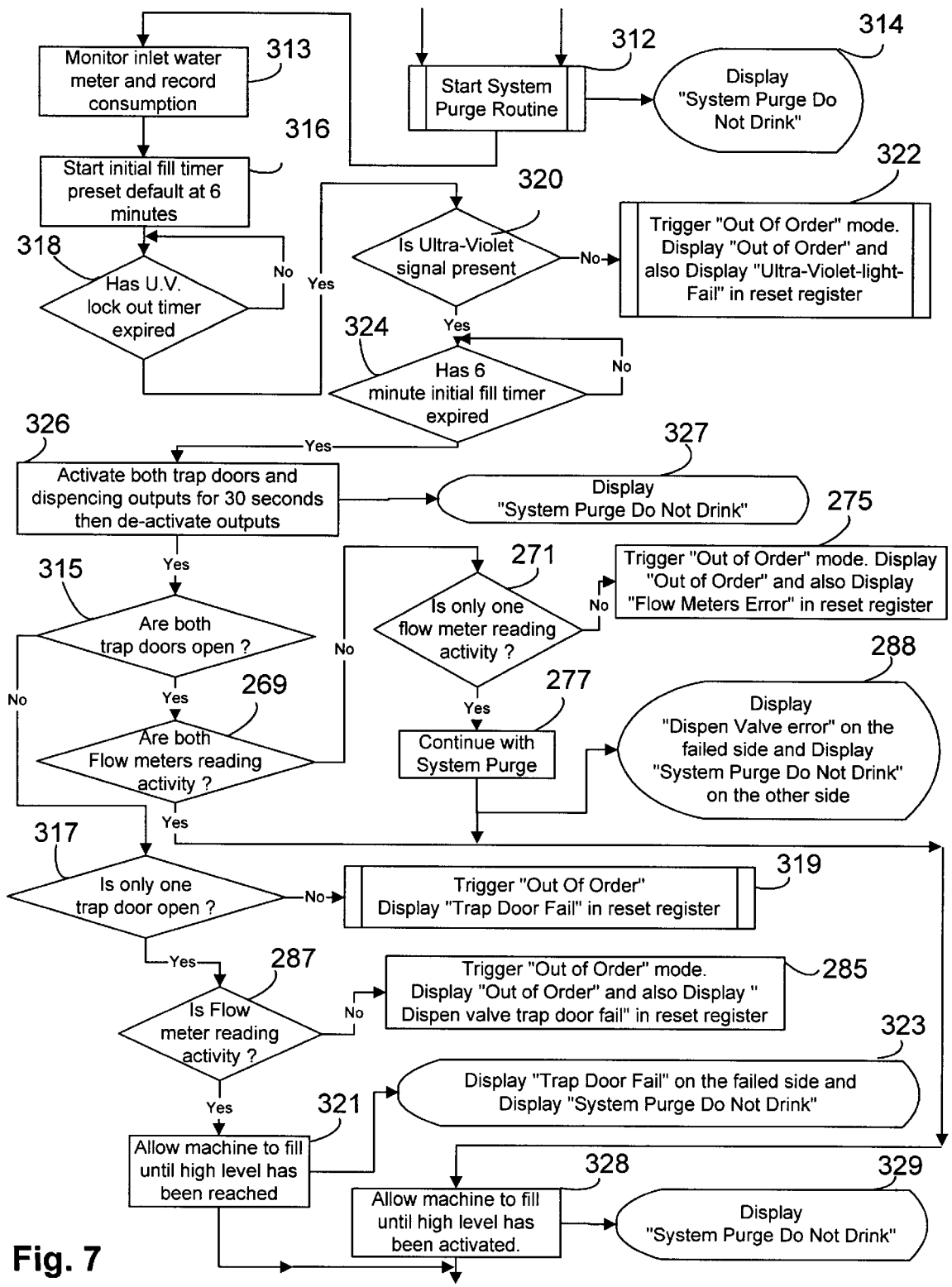
Figure 10:
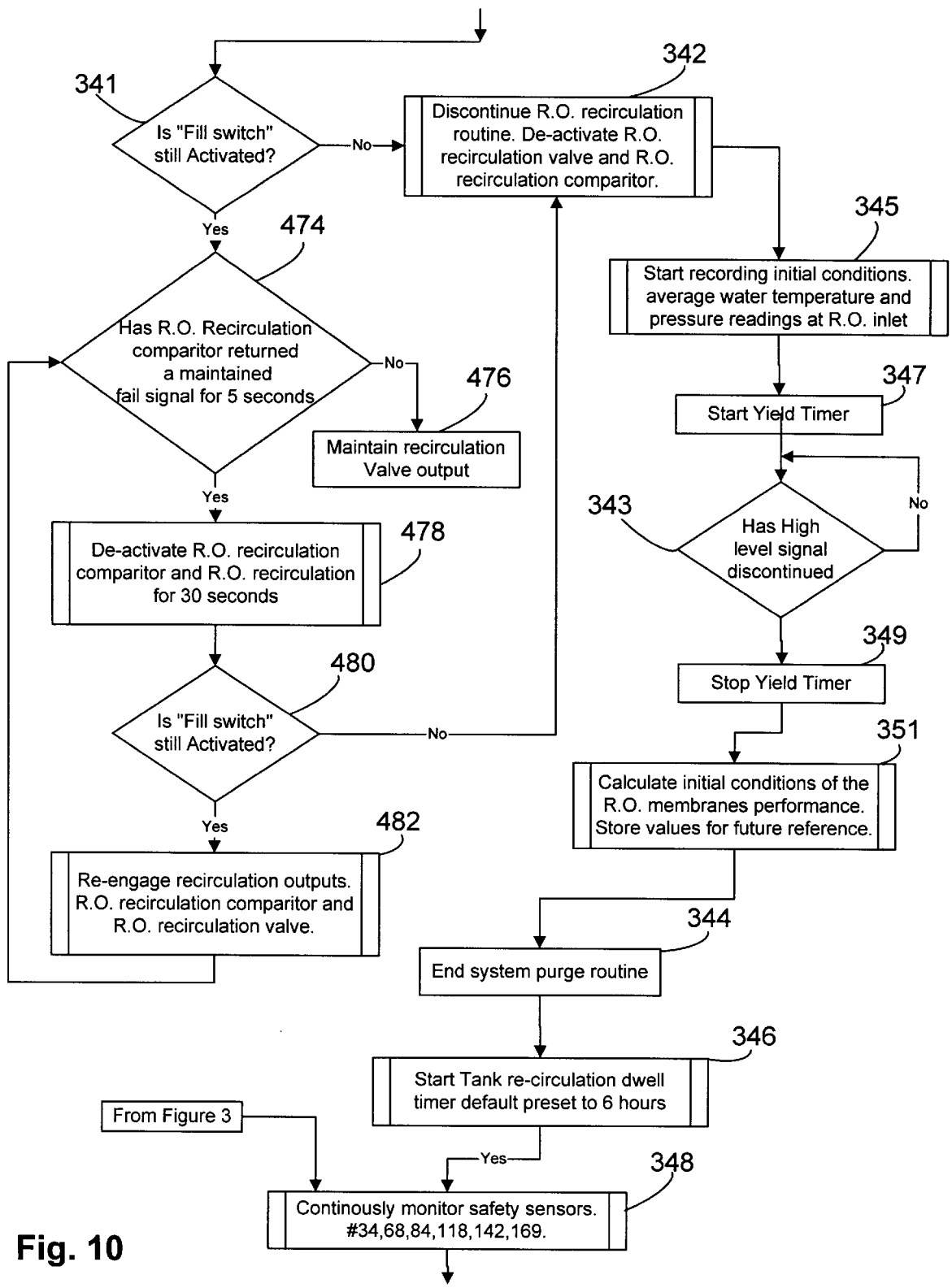
Figure 11:
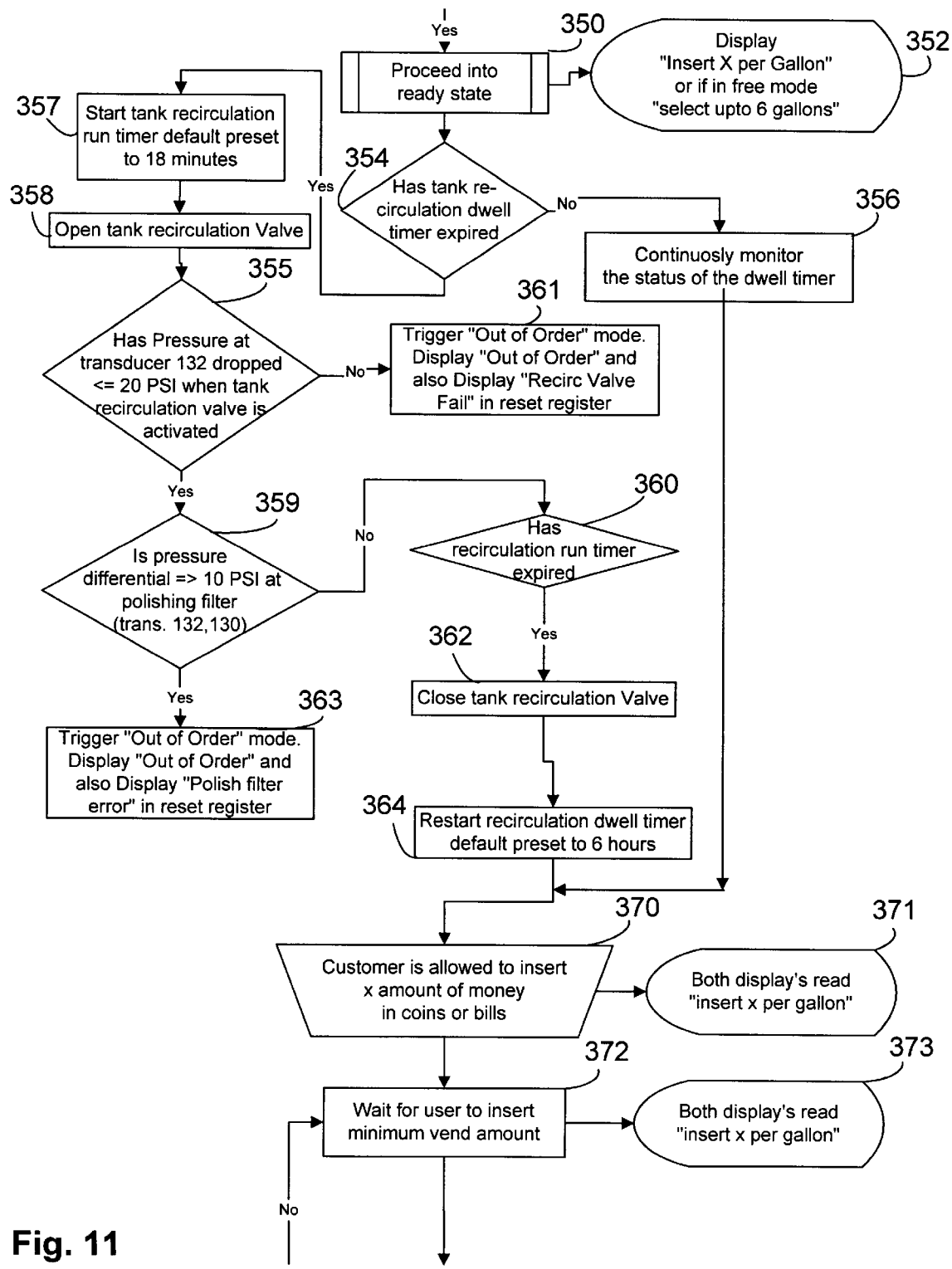
Figure 12:
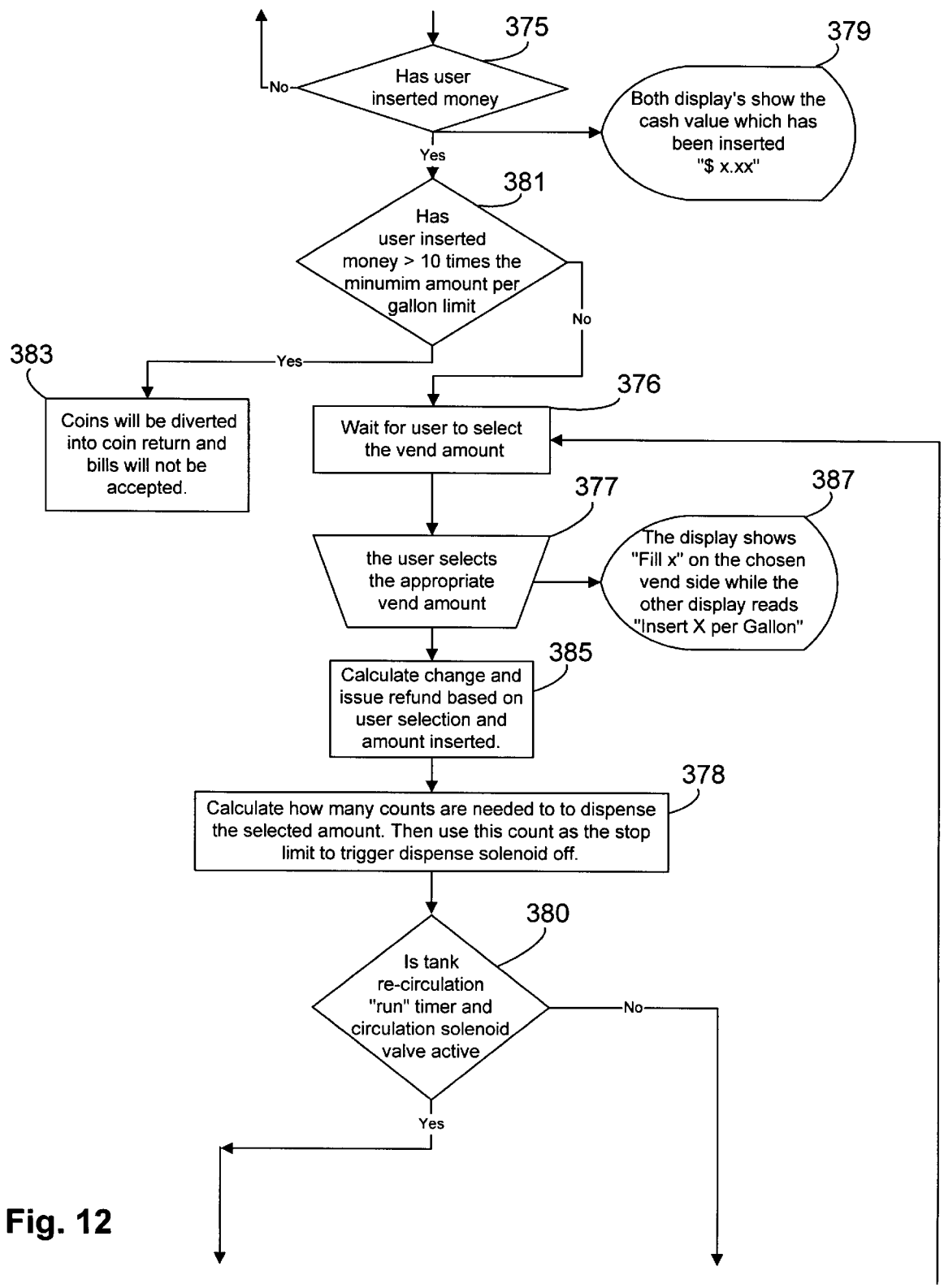
Figure 13:
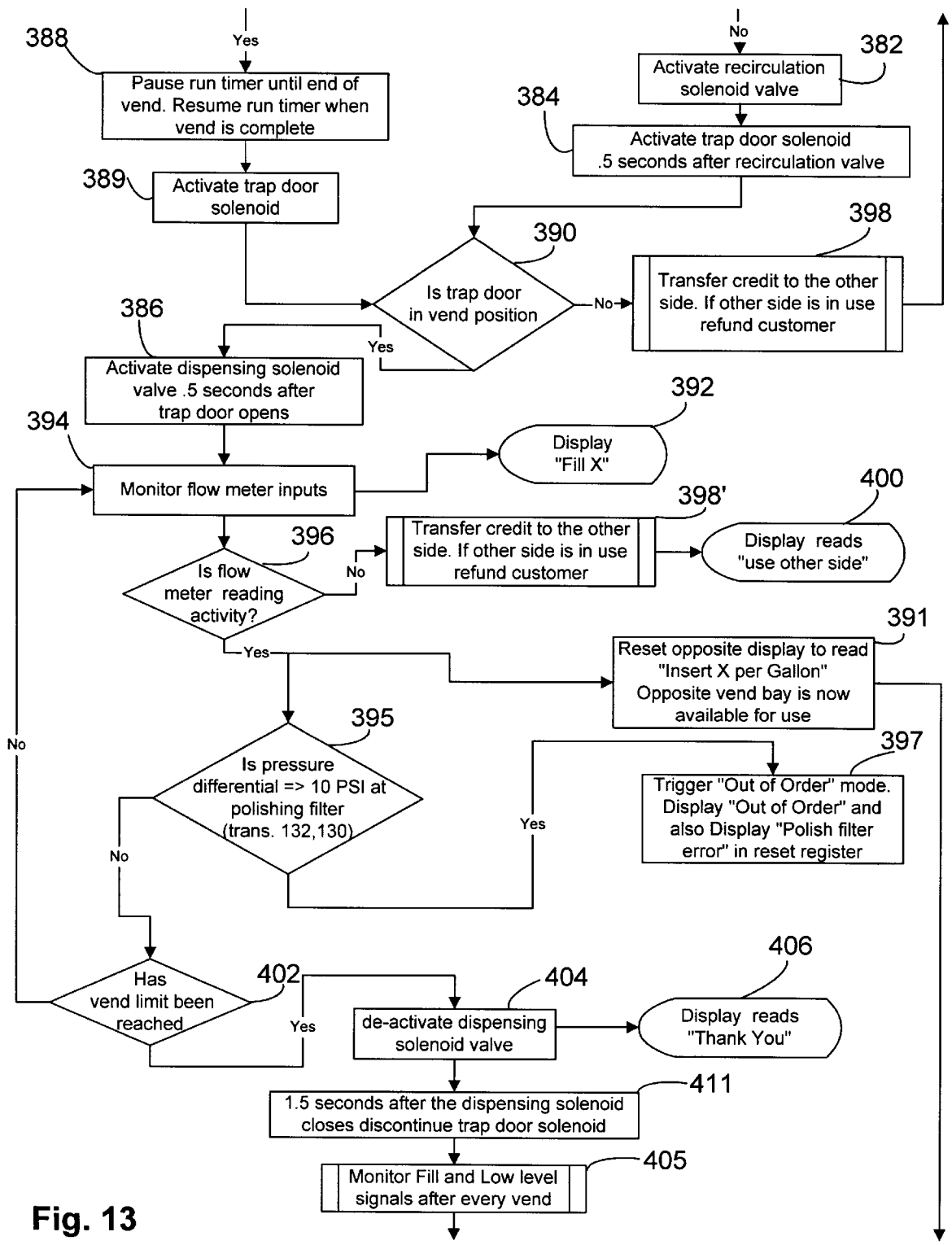

The system purge routine is shown from the top of FIG. 7 to the bottom of FIG. 10. Inlet water meter 62 is monitored in order to record the consumption of purge water as indicated at box 313. An initial fill timer is started and has a default setting of six minutes as indicated by box 316. The U.V. lockout timer of box 234 is polled to determine if the lockout time (e.g., three minutes) has expired as indicated by box 318. If this lockout timer has expired, the U.V. alarm 142 is polled at box 320 to determine if the U.V. signal is present. If not present, the out-of-order mode is triggered and "out-of-order" and "U.V. light failure" messages are displayed as indicated at box 322.

If the U.V. signal is present, a determination is made at box 324 as to whether the initial fill timer has expired after six minutes. If this timer has expired, the trap doors 171 and 175 and the dispensing valves 156 and 157 are open for 30 seconds as indicated by box 326. This 30 second dispensing operation during start-up insures that all air is purged out of the lines between the tank 92 and the dispensing valves 156 and 157. During this time, a "system purge do not drink" message is displayed as indicated by box 327.

During the 30 second purge, a determination is made at box 315 as to whether both trapped doors are open. If this determination is positive, a determination is made at box 269 as to whether both flow meters are reading activity. If determination 269 is negative, a determination is made at box 271 as to whether only one of the flow meters is reading activity. If this determination is negative, the unit is placed in its out-to-order mode, and "out-of-order" and "flow meter error" messages are displayed as indicated by box 275. If determination 271 is positive, the system purge is continued as indicated at box 277, and a "dispensing valve error" message is displayed on the LED of the failed side, while the LED display for the other side continues with the message of "system purge do not drink", as shown at box 288.

If the determination 315 is negative, a determination is made at box 317 as to whether only one trapped door is open. If this determination is negative, the unit is placed in its out-of-order mode, and "out-of-order" and "trapped door failure" messages are displayed as indicated by box 319. If determination 317 is positive, a determination is made at box 287 as to whether the corresponding flow meter is reading activity. If this determination is negative, the unit is placed in its out-of-order mode, and "out-of-order" and "trapped door failure" messages are displayed as indicated by box 285. If determination 287 is positive, the unit is allowed to fill until the high level sensor has been reached as indicated by box 321. During this time, "trapped door failure" and "system purge do not drink" messages are displayed as indicated by box 323. Similarly, if the determination at box 269 is positive to confirm that both flow meters are reading activity, the unit is also allowed to fill until the high level sensor has been activated as indicated by boxes 328 and 329.

Figure 8:
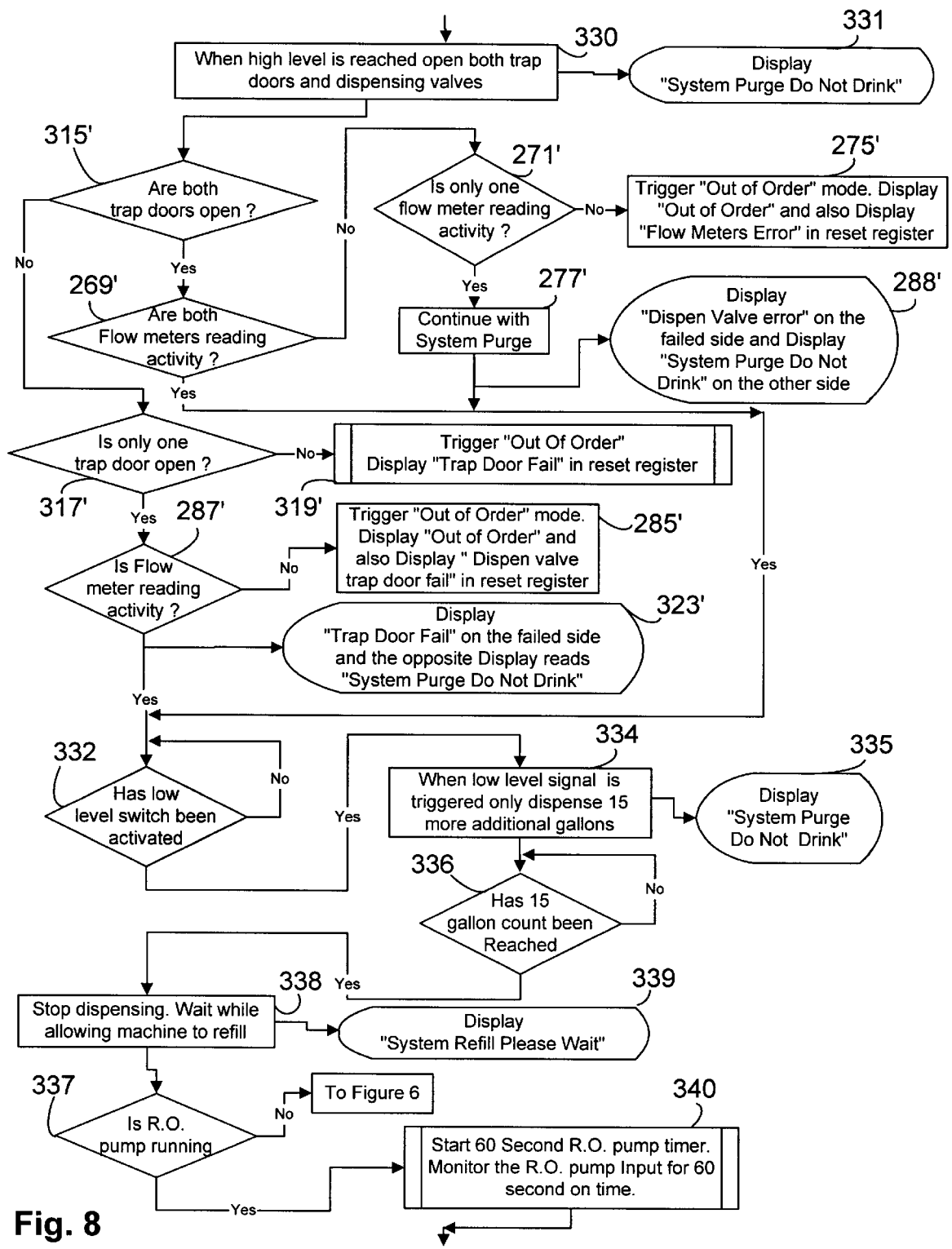
Figure 9:
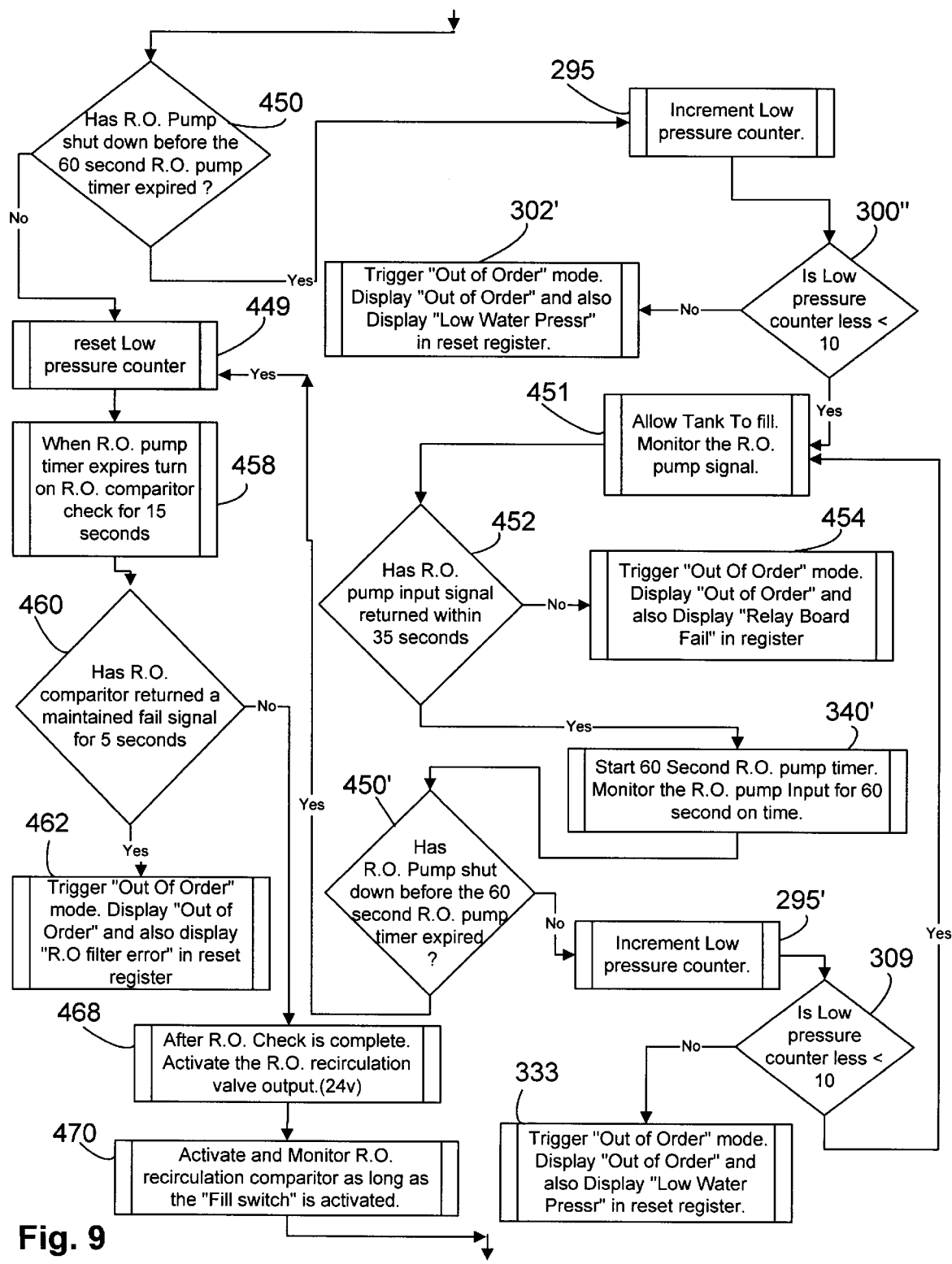

After 30 seconds of water dispensing, the trap doors and dispensing valves are closed and pump 70 is operated until the permeate in tank 92 reaches the high level sensor 114 as indicated at boxes 321 and 328. Upon activation of high level sensor 118, the trap doors 171 and 175 and the dispensing valves 156 and 157 are again opened and maintained open as indicated at box 330 in FIG. 8. During this time, the R.O. recirculation valve 110 is deactivated so that all concentrate released by pressure regulator 104 is discharged through outlet 106 as waste water. Since the flow through the dispensing valves 156 and 157, plus the waste water flow discharged through valve 104 and outlet 106, exceed the capacity of pump 70, the water level in tank 92 will now begin to drop. During this phase of the purge operation, the determinations and message displays referred to previously are repeated as indicated by the same number designations to which a prime symbol has been added, these determinations and messages being represented by boxes 315', 269', 271', 277', 275', 288', 317', 287', 319', 285', and 323' as shown in FIG. 8.

When the low water level switch 116 is activated, 15 additional gallons are dispensed, as indicated by boxes 332, 334 and 336. Throughout the operations represented by boxes 277, 277', 312, 321, 326, 328, 330, and 334, the display 210 and/or the display 212 displays the message "system purge, do not drink" as indicated by respective boxes 288, 288', 314, 323, 327, 329, 331 and 335. After the 15 gallon count has been reached by flow meters 152 and 153 combined, dispensing is stopped and tank 92 refilled as indicated at box 338, at which time the display 210 and/or the display 212 displays the message "system refill, please wait" as indicated by box 339.

A determination is made at box 337 as to whether the R.O. pump is running. If this determination is negative, the process goes to FIG. 6 to check out the various pressure and pump parameters specified therein. If determination 337 is positive, a 60 second R.O. pump timer for pump 70 is started as indicated at box 340. Should the R.O. pump shut down before this timer expires as determined at box 450 in FIG. 9, the low pressure counter is incremented at box 295. If this timer sequence is repeated 10 times such that the low pressure counter is incremented to 10 (or to some other preset limit) as determined at box 300", the unit is placed in its out-of-order mode, and "out of order" and "low water pressure" messages are displayed as indicated by box 302'. As indicated at box 451, the tank 92 is allowed to continue to be filled unless the low pressure counter has reached a count of 10. During this period, the control means monitors for a pump run signal as indicated at box 452. If the R.O. pump input signal has not returned within 35 seconds, the unit is placed in its out-of-order mode, and "out of order" and "relay board failure" messages are displayed as indicated by box 454.

If the pump run signal returns within 35 seconds and remains on for 60 seconds as determined at boxes 340' and 450', then the low pressure counter is reset as indicated by box 449. If the R.O. pump input signal has not remained on for 60 seconds, the low pressure counter is incremented at box 295' and a determination is made as to whether the low pressure counter has been incremented to 10 as indicated by box 309. If determination 309 is negative, the unit is placed in its out-of-order mode, and "out of order" and "low water pressure" messages are displayed as indicated by box 333. If determination 309 is positive, the process moves to box 451 already described.

When the R.O. pump timer expires after resetting of the low pressure counter, the R.O. comparator is turned on for a 15 second check as indicated at box 458. A determination is then made at box 460 as to whether the R.O. comparator has maintained a fail signal for 5 seconds. If so, the unit is placed in its out-of-order mode, and "out of order" and "R.O. filter error" messages are displayed as indicated by box 462. If the fail signal has not been maintained, the R.O. recirculation valve and the recirculation comparator are activated and the recirculation comparator is monitored as long as the fill switch 112 is active as indicated by boxes 468 and 470.

When the water level in tank 92 falls below fill switch 112, this switch closes and is then referred to as being "active". When the water level rises above switch 112, it opens and is no longer considered active. However, the closure of switch 112 causes a latching circuit (not shown) on the microprocessor I/O board 220 to latch and produce a fill requirement signal that keeps the water inlet valve 39 open and pump 70 running until the water level reaches the high level switch 114, which then opens and this unlatches the latching circuit to close valve 39 and stop pump 70. During the time period that pump 70 is running between the opening of switch 112 and the opening of switch 114, the tank 92 is receiving a bulk fill of dispensable water, the amount of which is determined by the vertical distance between these two switches. The bulk fill amount is preferably at least ten gallons (10 gal.), which is a multiple of the quantities of purified water that may be selected by a user for dispensing to a container, such as containers 160 and 161.

A determination is made at box 341 in FIG. 10 as to whether the fill switch is still active. If this determination is positive, a determination is made at box 474 as to whether the R.O. recirculation comparator has maintained a fail signal for 5 seconds. If determination 474 is negative, the recirculation valve output is maintained as indicated by box 476. If determination 474 is positive, R.O. recirculation and the R.O. recirculation comparator are deactivated for 30 seconds as indicated at box 478. A determination is then made at box 480 as to whether the fill switch is still active. If this determination is positive, the recirculation outputs and the R.O. recirculation comparator and recirculation valve are re-engaged as indicated at box 482, and the process returns to determination 474 previously described.

If either of the determinations 341 or 480 are negative, the R.O. recirculation routine is discontinued and the R.O. recirculation valve and recirculation comparator are deactivated as indicated by box 342. Also at this time, the yield timer is started and the initial water temperature and pressure readings at the R.O. inlet are recorded as indicated by boxes 345 and 347. When the high level switch signal is discontinued, the yield timer is stopped as indicated at boxes 343 and 349. As indicated by box 351, the initial conditions of the R.O. membrane performance are then calculated and stored for future reference. The system purge routine then ends as indicated by box 344.

At this time, a recirculation dwell timer is set for causing the recirculation pump 126 to be started every six hours as indicated by box 346 in FIG. 10. After setting of the recirculation dwell timer, the control means continuously monitors in accordance with box 348 all of the sensors having inputs related to safe operation of the system. The monitored safety sensors include base over flow switch 34, low pressure switch 68, high pressure switch 84, tank over flow switch 118, U.V. light alarm 142 and bay overflow switch 169. If all these sensor readings are still satisfactory, the control means proceeds into its ready state as indicated by box 350, in FIG. 11, at which time the messages displayed indicate the amount of money to be inserted in the money receiving devices 204 or 202 per gallon of purified water desired by the user, as indicated by box 352.

When the preset time entered in the recirculation dwell timer of box 346 expires, as indicated by the determination at box 354, recirculation valve 184 is opened and recirculation pump 126 is run for a time period preset in a recirculation run timer (default time=18 minutes) as indicated by boxes 357 and 358.

After the tank recirculation valve is opened at box 358, and before the recirculation run time has expired as determined at box 360, determinations are made as to whether the pressure at pressure transducer 132 has dropped to 20 psig or less as indicated at box 355, and as to whether the pressure differential across the polishing filter 128 is equal to or greater than 10 psig as indicated at box 359. If low pressure is determined at box 355, the unit is placed in its out-of-order mode, and "out-of-order" and "recirculation valve failure" messages are displayed as indicated at box 361. If excessive pressure differential is determined at box 359, the unit is placed in its out-of-order mode, and "out of order" and "polishing filter error" messages are displayed as indicated at box 363.

After a positive determination at box 355 and a negative determination at box 359, and upon expiration of the time period set in the run timer at box 360, the recirculation valve 184 is closed and the recirculation pump 126 cuts off when its discharge pressure reaches a preset value, such as 35 psig, as measured by pressure transducer 130. At the same time, the recirculation dwell timer is reset to its preset dwell time, such as its default setting of six hours. These operations are indicated by boxes 362 and 364 in FIG. 11.

When the dispensing apparatus 20 is in its ready state, both of the displays 210 and 212 indicate the amount of money to be inserted per volume of purified water desired by the customer, and the user is allowed to insert the corresponding amount of money, either as coins or paper bills, as indicated by boxes 370, 371, 372 and 373. When the user has inserted an appropriate amount of money and selected an appropriate amount of water to be dispensed, the corresponding amount of water is then dispensed through the dispensing valve at the dispensing bay selected as indicated by boxes 375, 376, 377 and 378 in FIG. 12.

The amount of water dispensed corresponds to the number increments counted by the flow meter 152 or 153, each of these counts corresponding to the volume increments presetted into the control system. For example, each count may correspond to 0.5 gallons. The amount of money inserted by the user is determined at box 375 and this amount is displayed on both the right display 210 and the left display 212. This displaying step is represented by box 379. Thus, the amount of water being dispensed is measured by the corresponding flow meter 152 or 153, and the signal outputted by this meter is compared against the amount selected and paid for by the user, as indicated by box 378.

The amount of water selected by the user for dispensing by the apparatus 20 is displayed on the display for the corresponding vending bay as indicated by the box 387. The maximum amount of money that the apparatus is set up to accept is represented by box 381. For example, if the maximum money inserted exceeds ten times the amount charged per gallon, any further coins inserted will be diverted to the coin return and no further paper bills will be accepted as indicated by box 383. If the value of the amount of water selected has a value less than the amount money inputted, the amount of change due to user is calculated and this amount is refunded to the coin return as indicated by box 385. The user selects the desired dispensing bay and the desired amount of water to be dispensed by using the keypad 200.

As has been previously indicated, a certain proportion of the water in tank 92 is recirculated to this tank while water is being dispensed by the dispensing means 28. Thus, if the recirculation valve 184 is not active when water dispensing is commenced as determined at box 380 (FIG. 12), the recirculation valve 184 is activated at box 382 (FIG. 13) before any water is dispensed. A short time after this (such as 0.5 seconds), the trap door of the selected bay is opened as indicated by box 384, and a short time thereafter (such as 0.5 seconds), the dispensing solenoid valve is opened as indicated by box 386. Should the recirculation valve already be open when dispensing is to commence, the recirculation run timer is paused at box 388 until dispensing is completed, and the designated trap door is opened immediately as indicated by box 389.

After the trap door solenoid is actuated at either box 384 or 389, a determination is made at box 390 as to whether the trap door is in its vended position before the dispensing valve solenoid is actuated at box 386. During water dispensing, the flow meters 152 and 153 are monitored as indicated at box 394, and the display corresponding to the bay selected shows the selected amount of water to be dispensed as indicated by box 392.

If the trap door fails to reach its vended position, the user's credit is transferred to the other bay, or if the other bay is in use, the uses money is refunded as indicated at box 398. Upon transfer of the user credit to the other bay, the dispensing process returns to box 376 in FIG. 12.

Activation of the appropriate flow meter is detected at box 396, and if active, a determination is made at box 395 of the pressure differential across the polishing filter 128. Excessive differential places the unit in its out-of-order mode and displays "out-of-order" and "polish filter error" messages as indicated at box 397. At this time, the opposite vending bay is made available for use and the amount to be inserted per gallon is displayed on the opposite display as indicated by box 391. If the selected bay flow meter is not active, the credit for the amount of water selected and paid for is transferred to the other dispensing bay, or the user's money is refunded if the other bay already is in use, as indicated by box 398'. If the other bay is not in use so that the credit is transferred, the display for the faulty flow meter displays the message "USE OTHER SIDE" as indicated by box 400.

When the flow meter reading corresponds to the vend limit paid for by the user as indicated at box 402, the dispensing solenoid valve is deactivated as indicated at box 404. A short time later, such as 1.5 seconds, the corresponding bay door is closed as indicated by box 411. The corresponding display reads "THANK YOU", as indicated by box 406. After the trap door closes at box 411, the fill and low level signals from the holding tank and the vended water totals are monitored as indicated by boxes 405 and 403 in FIGS. 13 and 14, respectively. A determination is then made at box 409 as to whether the vended total is equal to or greater than 200 gallons since the last refill of tank 92. If this determination is negative, a further determination is made at box 407 as to whether the fill and/or low level switches in tank 92 are active. If determination 407 is positive, the process moves to FIG. 17, and if negative, moves to box 408 in FIG. 14.

If recirculation of water to tank 92 was not in progress at the time dispensing commenced as determined at box 408, the recirculation solenoid 184 is deactivated when dispensing has been completed as indicated by box 410. However, if recirculation was in progress when dispensing commenced, recirculation valve 184 is kept open until the recirculation run timer expires as indicated by box 412 in FIG. 14. The recirculation valve then closes. Thereafter, the dispensing apparatus is returned to its ready state and both the displays 210 and 212 show the amount of money to be inserted per gallon of water to be dispensed as indicated by boxes 416 and 418.

Except for boxes 391, 398, 298' and 400, the foregoing logic sequences are for using a single dispensing bay. In this regard, the present invention is equally applicable to providing single or multiple dispensing bays. In the preferred embodiment shown in FIGS. 1 and 2, there are dual dispensing bays, namely a left dispensing bay 29 and a right dispensing bay 31. Accordingly, both of these bays may be available simultaneously and the control means includes dispensing logic for the other or "opposite" bay as indicated by box 391 in FIG. 13.

If the determination at box 409 is positive, a yield routine is initiated on the next tank fill signal as indicated by box 413. As also indicated by this box, if vending occurs during this yield test, it is reinitiated on the next fill. A determination is then made at box 414 as to whether the fill is in progress such that the fill switch only has been discontinued. If determination 414 is positive, the inlet water meter 62 is monitored and the water consumption is recorded as indicated by box 415. The average water pressure and temperature at the inlet to the R.O. filter are also monitored and recorded as indicated by box 417. A determination is then made as to whether the high level switch 114 has been deactivated as indicated at box 419. If the determination 419 is positive, the yield of the filter membrane is calculated as shown by box 420. Thereafter, a determination is made at box 421 as to whether the R.O. filter yield is within plus or minus 17% (or some other selected percentage) of the initial conditions at the start up of the unit. If this determination is positive, a ready state condition is maintained as indicated at box 423. If determination 421 is negative, the unit is placed in its out-of-order mode, and "out-of-order" and "yield error" messages are displayed as indicated at box 445.

Figure 14:
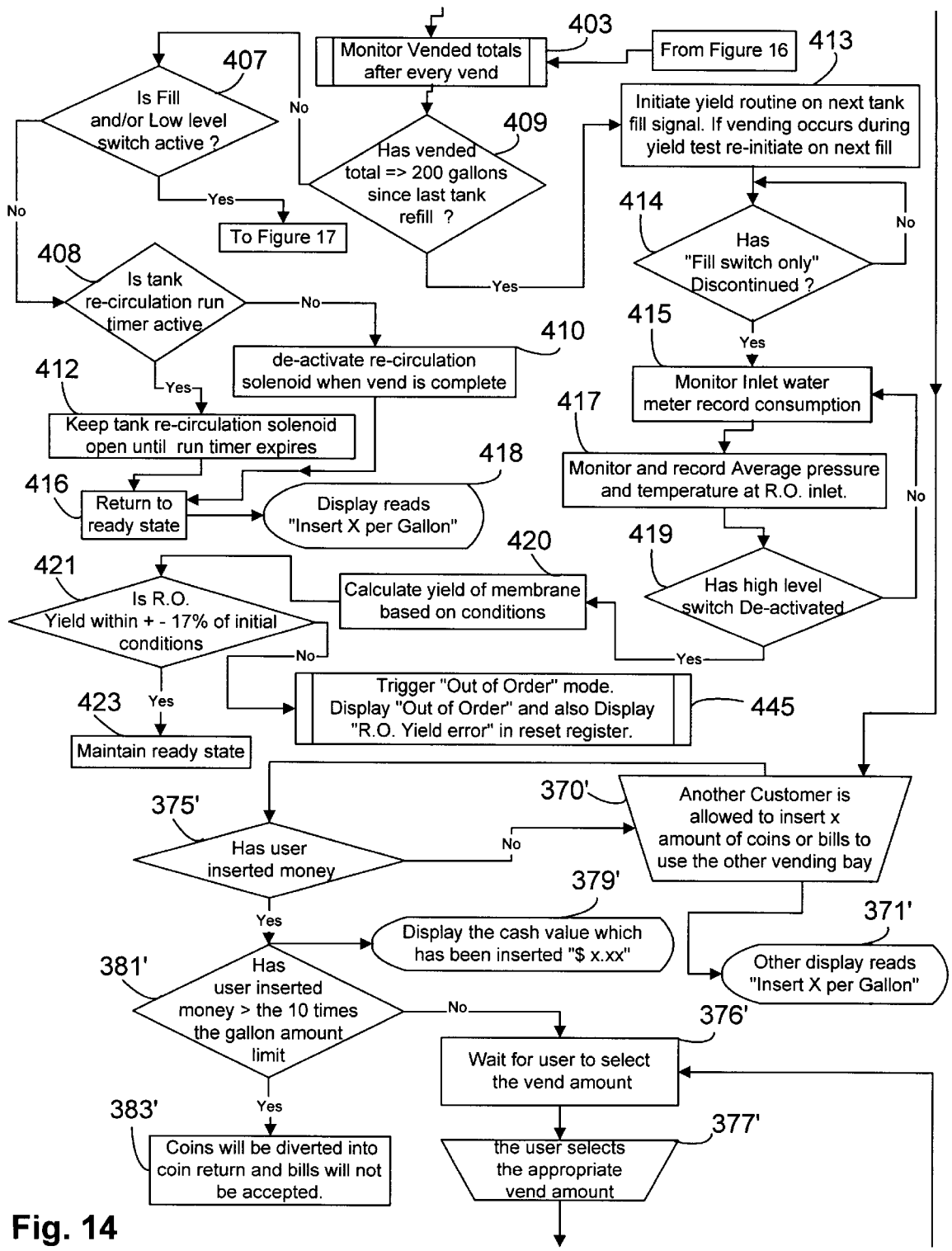
Figure 15:
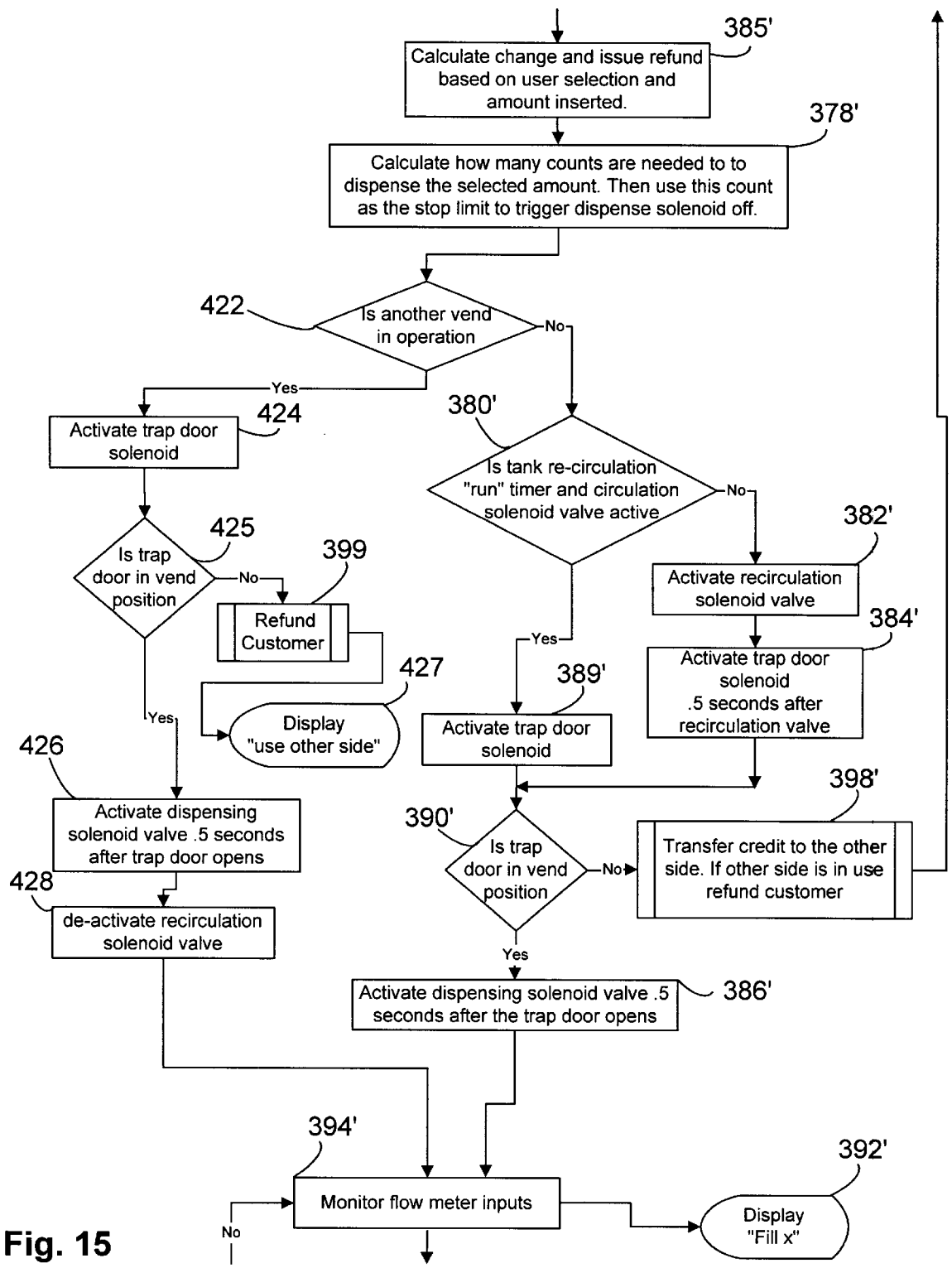
Figure 16:
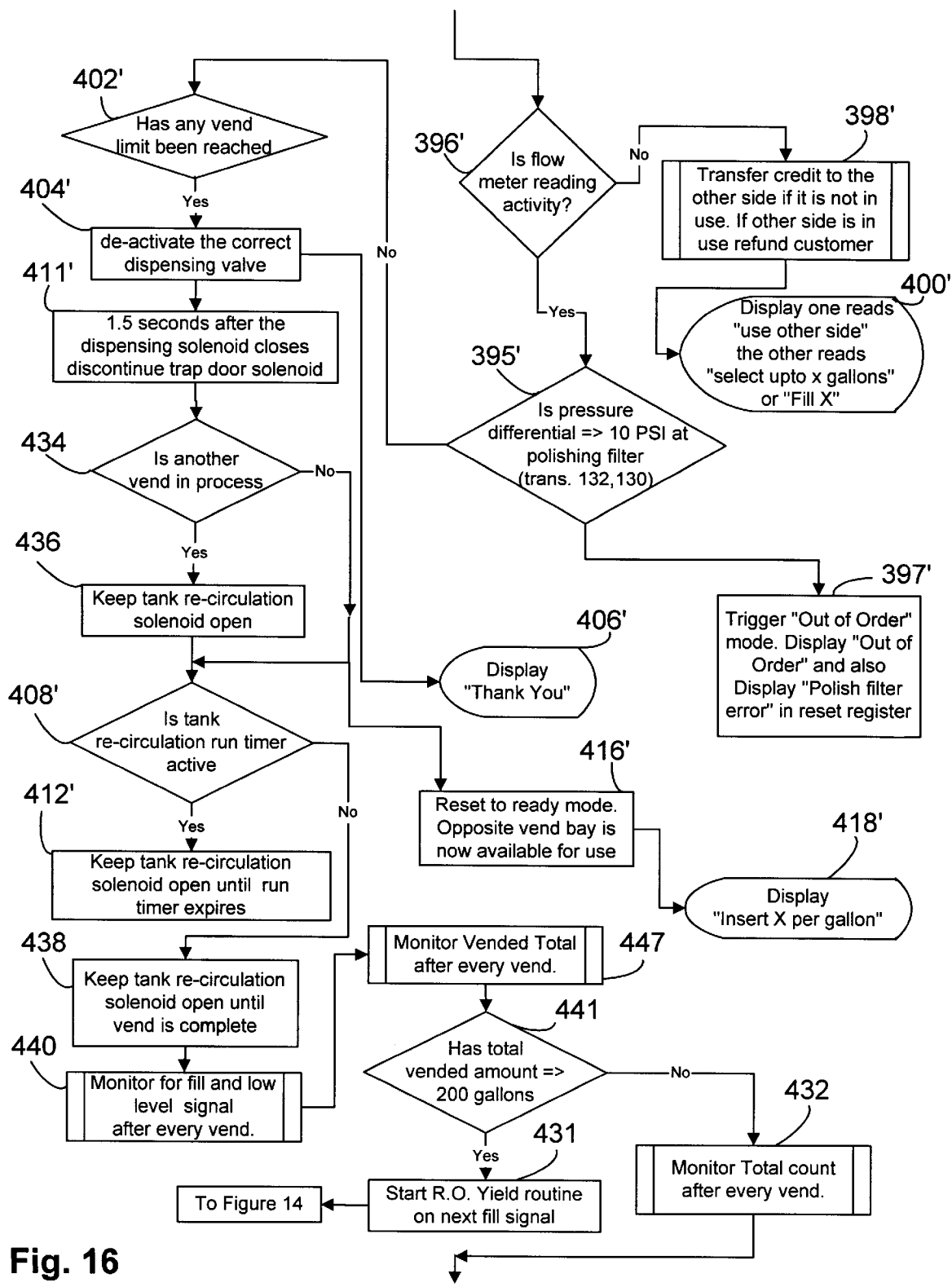

The logic for the second or other dispensing bay is essentially the same as for the first or sole dispensing bay already described. This is indicated in FIGS. 14, 15 and 16 by adding a prime symbol to the numbered boxes representing the same operations for the second bay as for the first bay. Thus, the operations represented by the boxes 370', 371', 375', 376', 377', 378', 379', 380', 381', 382', 383', 384', 385', 386', 389', 390', 392', 394', 395', 396', 397', 398', 400', 402', 404', 406', 408', 411', 412', 416' and 418' correspond to the same operations as for the boxes previously described with the same numbers but without the prime symbol.

A different logic sequence is applicable if two vending operations are being performed simultaneously as indicated at box 422 in FIG. 15. In this instance, the second bay door and the second dispensing valve are activated until the second dispensing operation has been completed as indicated by boxes 424, 425 and 426. During this time, the recirculation valve 184 is closed as indicated by box 428. Where one of two active dispensing valve is thereafter deactivated because its vend limit has been reached, the recirculation valve is reopened while the second vending operation is in progress as indicated by boxes 434, 436 and 438 in FIG. 16. A determination is made at box 425 as to whether the trap door of the second bay is in the vend position, and if this determination is negative, the user's money is refunded and a message is displayed to "use other side" as indicated by boxes 399 and 427.

After every vending operation, the control means polls the sensors 112 and 116 for a fill level signal or a low level signal as indicated by box 440. The total amount of water vended is also monitored after every vending operation and a determination is made as to whether the vended amount is equal to or greater than 200 gallons as indicated by boxes 447 and 441. If determination 441 is positive, the R.O. filter yield routine is started on the next fill signal and the process moves to FIG. 14 as indicated at box 431. If determination 441 is negative, the water vending count is continued as indicated by box 432 and the process moves the low water level signal determination 433 in FIG. 17.

Figure 17:
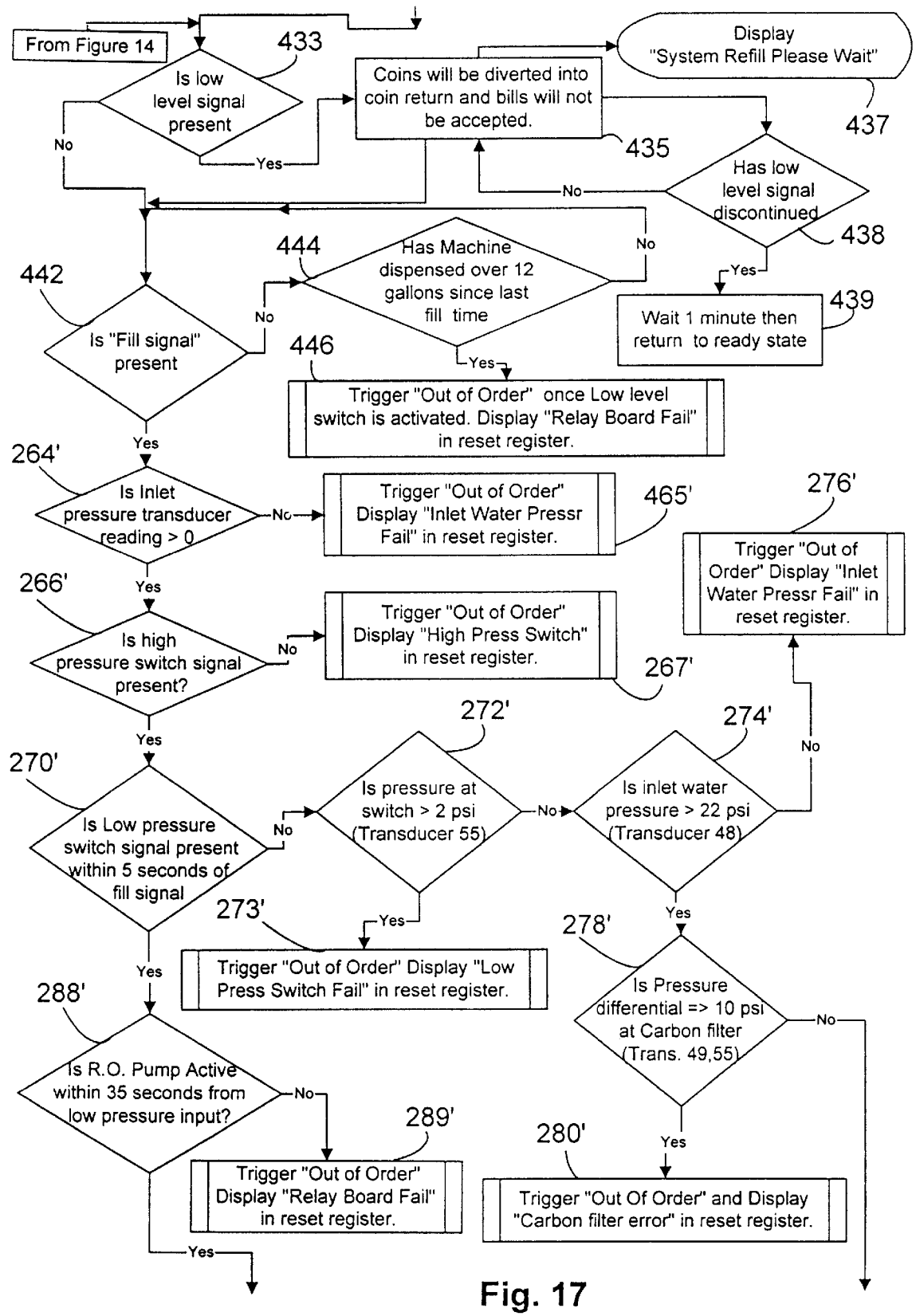

If the fill level and low level signals are not present as determined at boxes 433 and 442, a query is made as to whether over 12 gallons have been dispensed since the last fill signal was received as indicated at box 444 in FIG. 17. If this query is positive, the out-of-order mode is triggered and "out-of-order" and "relay board failure" messages are displayed in the reset register as indicated by box 446. If the low water determination at box 433 is positive, the coins deposited by the user are diverted into the coin return tray and paper bills will not be accepted as indicated by box 435. Also, a message will be displayed indicating that the system is undergoing a refill operation so that the user should wait until the refill is complete as indicated by box 437. A determination is then made at box 438 as to whether the low level signal has been discontinued, and if this determination is positive, the system returns to a ready state after a one-minute delay as indicated by box 439. If determination 438 is negative, money will still not be accepted in accordance with box 435.

Figure 18:
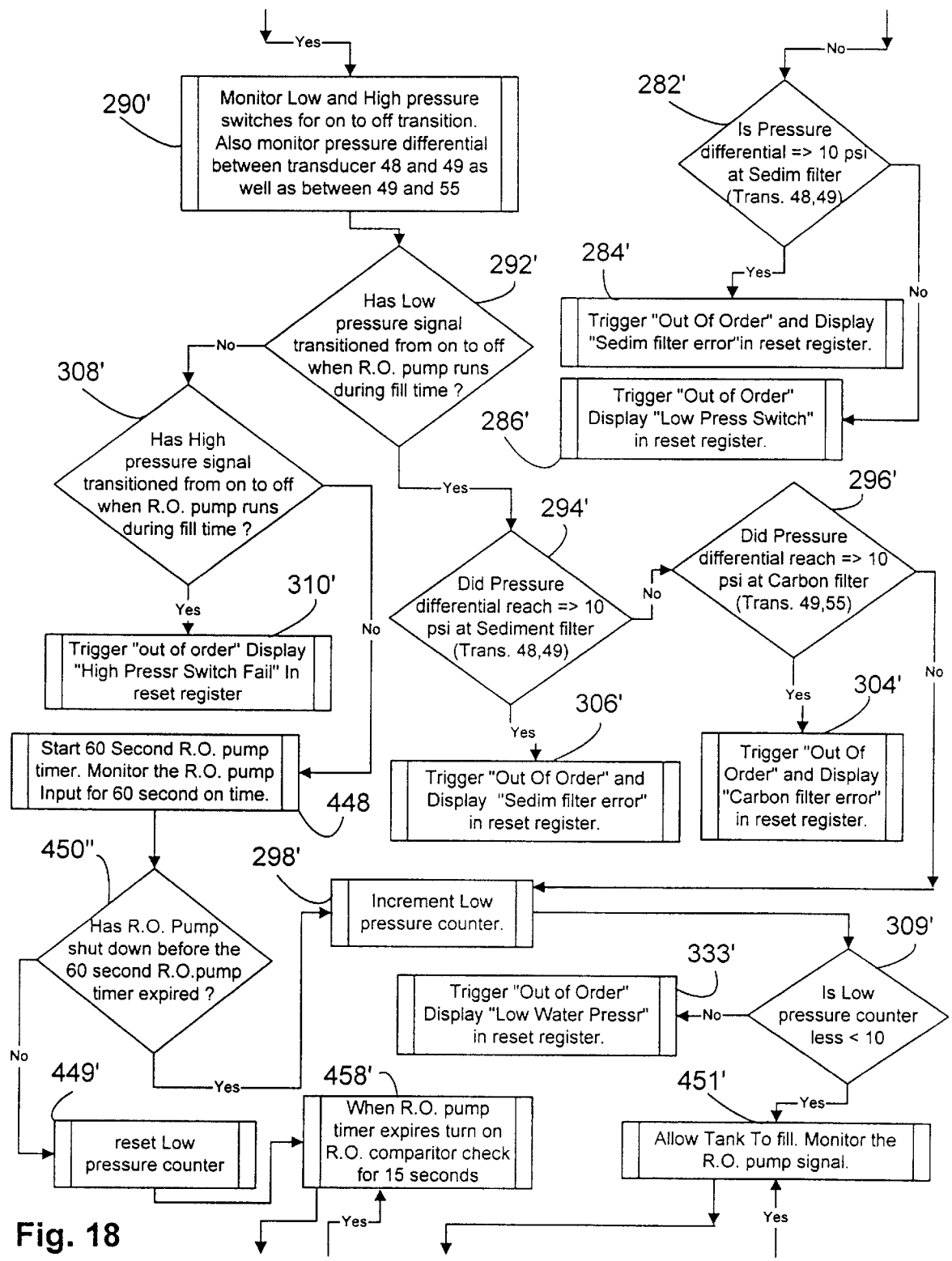
Figure 19:
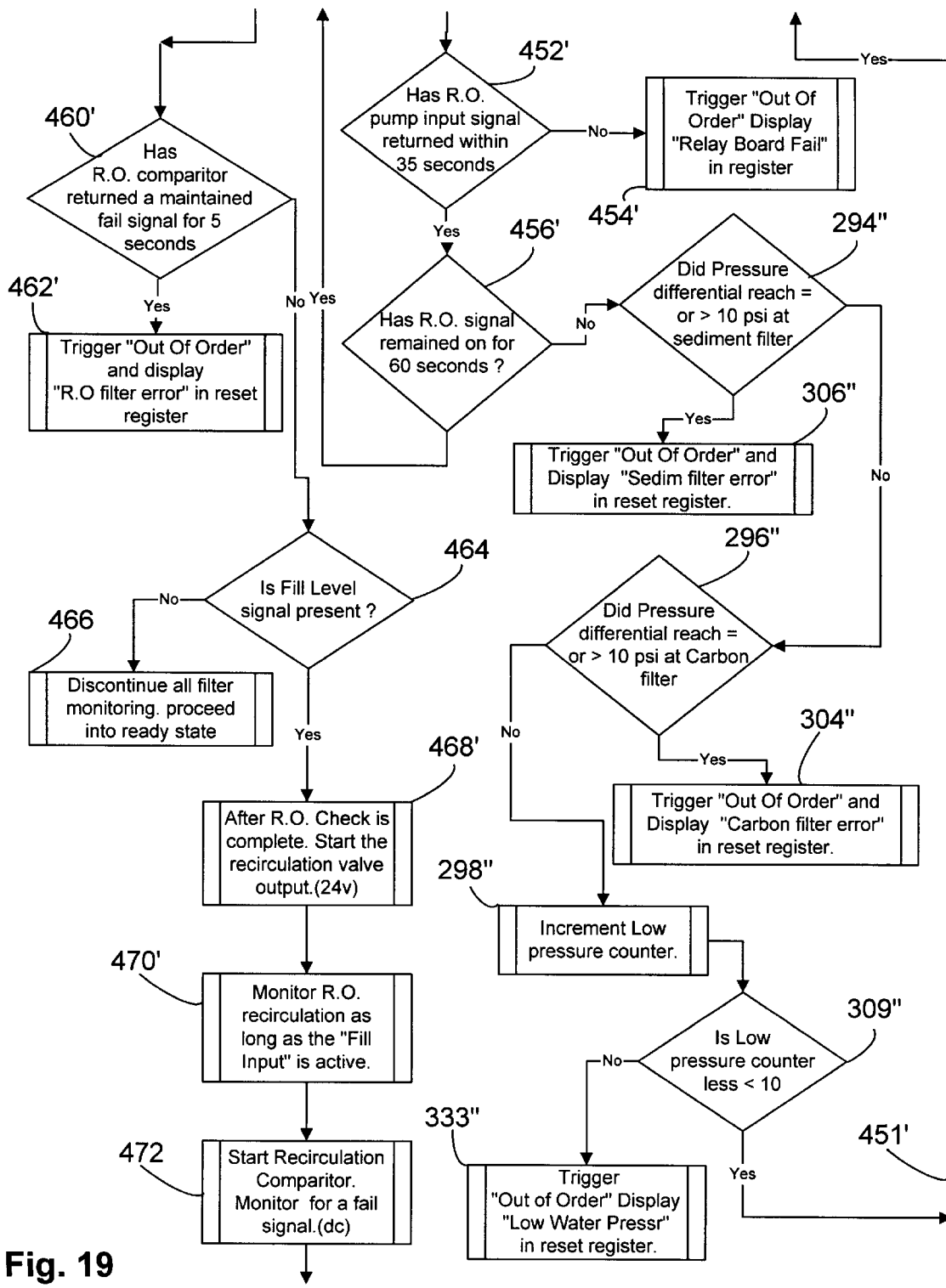
Figure 20:
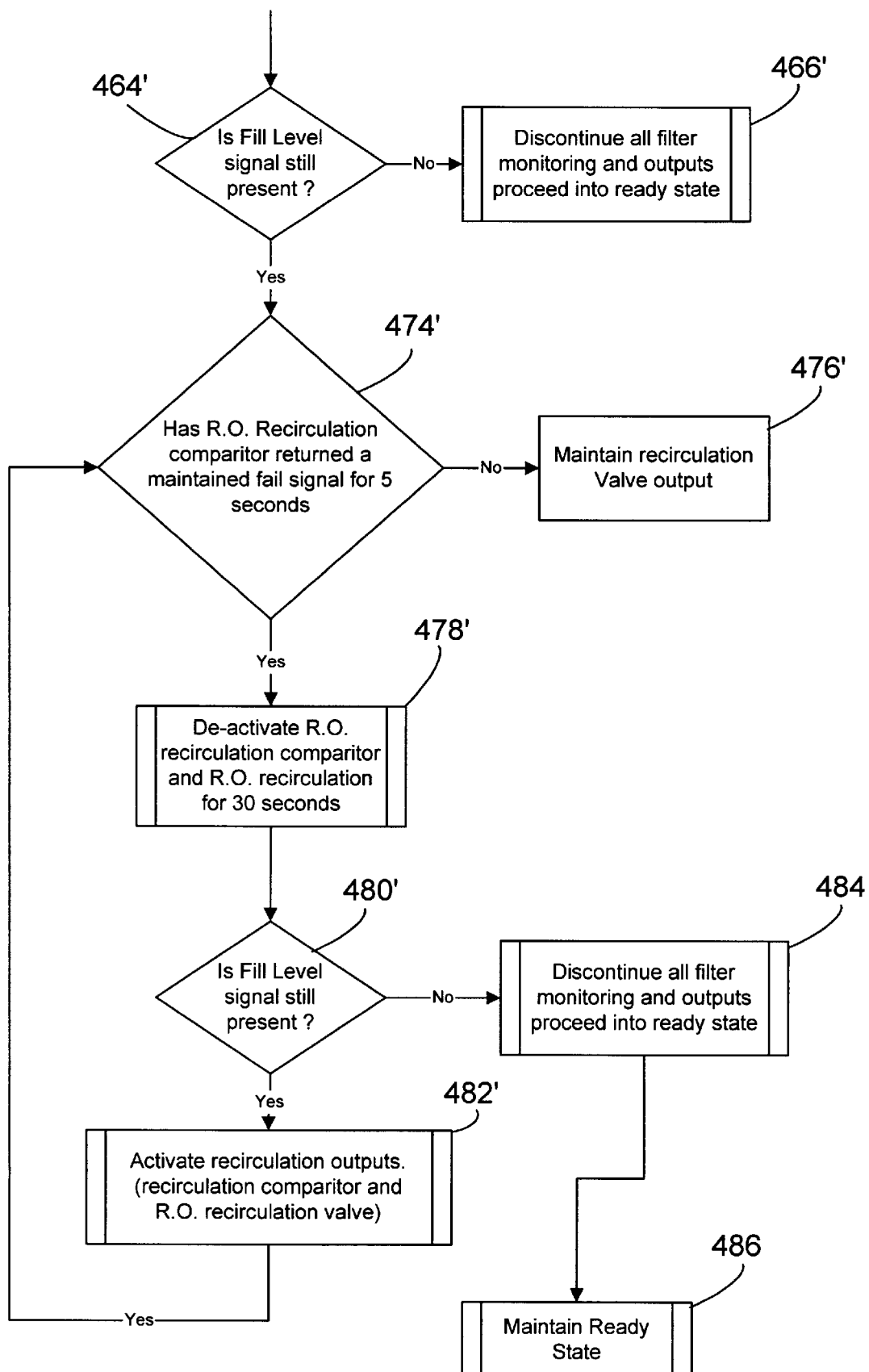

If the fill signal is present as determined at box 442, some of the same logic sequences and determinations as shown in FIGS. 4–6 are repeated as shown in FIGS. 17–19, wherein the same numerical box designation is used for the same operation with the addition of a prime symbol. These logic determinations and associated displays are 264', 265', 266', 267', 270', 272', 273', 274', 276', 278', 280', 282', 284', 286', 288', 289', 290', 292', 294', 296', 298', 300', 302', 304', 306', 308' and 310', and these correspond to the same numerical boxes as shown in FIGS. 4–6 without the prime symbol.

Referring now to FIG. 18, if there has been no loss of pump pressure, as would be indicated by a high pressure signal transitioning from on to off at box 308', there is started a 60 second R.O. pump timer for pump 70 as indicated at box 448. Should the R.O. pump shut down before this timer expires as determined at box 450", the low pressure counter is incremented at box 298'. If this timer sequence is repeated ten times such that the low pressure counter is incremented to 10 (or to some other preset limit) as determined at box 309', the out-of-order mode is triggered and "out-of-order" and "low water pressure" messages are displayed as indicated at box 333'. If the timer expires without pump shutdown, the low pressure counter is reset at box 449'.

As indicated at box 451', the tank 92 is allowed to continue to be filled unless the low pressure counter reached a count of 10. During this period, the control means monitors for a pump run signal as indicated by box 452' (FIG. 19). If the pump run signal has not returned within 35 seconds, the out-of-order mode is triggered, and "out-of-order" and "relay board failure" messages are displayed as indicated by box 454'. If the pump run signal returns within 35 seconds and remains on for 60 seconds as determined at box 456', then the R.O. comparator board 224 is checked for 15 seconds as indicated by box 458'.

If the R.O. pump signal has not remained on for 60 seconds, the pressure differentials across the sediment filter and the carbon filter are monitored in the same way and with the same results as previously indicated. This is shown by the boxes 294", 296', 298", 304", 306", 309" and 333", the same numbers being used as previously but with a different superscript symbol, namely a double prime. The comparator check of box 458' (FIG. 18) also takes place and the low pressure counter is reset at box 449' where the pump 70 has not shut down before expiration of the 60 second timer as determined at box 450" previously described.

After the R.O. comparator check at box 458', a query is made at box 460' to determine if the R.O. comparator has maintained a fail signal for five seconds. If so, the out-of-order mode is triggered, "out of order" and "R.O. filter error" messages are displayed as indicated at box 462'. If the fail signal has not been maintained at box 460', a query is made to determine if the fill signal is present, and if not, all filter monitoring is discontinued and the apparatus 20 is placed in its ready state as indicated by boxes 464 and 466.

If the fill signal is present after the R.O. comparator monitoring has been completed, concentrate recirculation is started by opening the recirculation valve 110 in recirculation line 108 as indicated by box 468'. As indicated by boxes 470' and 472, the recirculation of concentrate and its effect on operation of the R.O. filter 80 is monitored by the conductivity inputs into the R.O. recirculation comparator 224 from the conductivity cells 74 and 98 as long as the fill signal is present. If at any time the fill signal is lost, all filter monitoring is discontinued and the apparatus is placed in its ready state as indicated by boxes 464' and 466' in FIG. 20.

At box 474', the recirculation comparator is polled to determine if it has maintained a fail signal for at least five seconds. If not, concentrate recirculation is maintained as indicated by box 476'. If the fail signal has been maintained, which indicates that the conductivity differential between the R.O. input line 78 and permeate output line 90 is too small, recirculation valve 110 is closed for one minute as indicated by box 478'. If the fill signal is still present after thirty seconds as determined at box 480', recirculation of concentrate is restarted by opening valve 110 as indicated at box 482'. If the fill signal is not present at this time, all filter monitoring is discontinued and the apparatus 20 is maintained in its ready state as indicated by boxes 484 and 486.

The embodiments describe above represent non-limiting examples of the invention and many other variations and modifications are possible without departing from the spirit and scope of the invention. Accordingly, the invention is not limited in its application to the details of structure and process specifically described or illustrated herein, and it may be practiced otherwise than as specifically described in this specification and illustrated in the accompanying drawings. All such modifications and variations intended to be are within the scope of the appended claims.

What is claimed is:

1. A dispensing apparatus for dispensing purified water, said apparatus comprising:

supply means for connecting said apparatus to a source of input water to be purified;

tank means for holding first purified water;

first purifying means connected between said supply means and said tank means for purifying said input water to provide said first purified water, and for conveying said first purified water to said tank means;

dispensing means for dispensing second purified water to a container;

second purifying means connected between said tank means and said dispensing means for further purifying said first purified water to provide said second purified water; and, recirculation means connected between said second purifying means and said tank means for recirculating said second purified water from an outlet to an inlet of said tank means.

2. A dispensing apparatus according to claim 1 further comprising control means for causing said second purified water to be recirculated periodically from said tank outlet to said tank inlet.

3. A dispensing apparatus according to claim 1 further comprising control means for causing one portion of said second purified water to be recirculated from said tank outlet to said tank inlet when another portion of said second purified water is being dispensed to the container by said dispensing means.

4. A dispensing apparatus according to claim 1, wherein the recirculation means for recirculating said second purified water is a first recirculation means; wherein said first purifying means comprises reverse osmosis filter means for separating input water into a permeate containing a reduced amount of dissolved solids relative to said input water and a concentrate containing an increased amount of dissolved solids relative to said input water, an inlet means for providing a flow of said input water to said osmosis filter means, and a concentrate outlet means connected to a waste water conduit for discharging said concentrate to ambient; and wherein said dispensing apparatus further comprises second recirculation means connected between said concentrate outlet means and said inlet means for recirculating at least a portion of said concentrate to said inlet means.

5. A dispensing apparatus according to claim 4 further comprising sensing means for sensing a characteristic of said first purified water, and control means for controlling the amount of concentrate recirculated to said inlet means by said second recirculation means.

6. A dispensing apparatus according to claim 4 further comprising water level sensing means for sensing a first water level in said tank means and a second water level in said tank means greater than said first water level, flow rate sensing means for sensing the rate of water flow into said reverse osmosis filter means, and control means for detecting a clogged condition of said reverse osmosis filter means by comparing said flow rate with the time period required for said permeate to raise the water level of said tank means from said first water level to said second water level.

7. A dispensing apparatus according to claim 1, wherein said first purifying means comprises sediment filter means for removing sediment from said input water, carbon filter means connected to an outlet of said sediment filter means for removing contaminants from said input water, pump means connected to an outlet of said carbon filter means for pumping said input water, and reverse osmosis filter means for removing dissolved solids from said input water and having an inlet connected to said pump means and an outlet connected to said tank means.

8. A dispensing apparatus according to claim 7 further comprising control means which includes:

sediment filter measuring means for measuring a differential pressure across said sediment filter;

carbon filter measuring means for measuring a differential pressure across said carbon filter;

inlet conductivity measuring means for measuring the conductivity of water flowing between said carbon filter means and said reverse osmosis filter means;

water flow measuring means for measuring the rate of water flow from said supply means to said reverse osmosis filter means;

outlet conductivity measuring means for measuring the conductivity of water flowing from the outlet of said reverse osmosis filter means to said tank means; and, microprocessor means for processing outputs from each of said measuring means, each of said outputs permitting said microprocessor means to monitor an operating condition corresponding to the respective measuring means.

9. A dispensing apparatus according to claim 8, wherein said second purifying means comprises dispensing pump means connected to an outlet of said tank means for pumping water from said tank means, polishing filter means connected to an outlet of said dispensing pump means for filtering said tank water, and an ultraviolet sterilizing means connected to an outlet of said polishing filter means for applying ultraviolet light to destroy microorganisms present in said tank water as it passes from an inlet to an outlet of said sterilizing means.

10. A dispensing apparatus according to claim 9, wherein said control means further comprises:

polishing filter measuring means for measuring a pressure differential across said polishing filter means; and, sterilizing measuring means for measuring the amount of ultraviolet light applied to said tank water passing through said ultraviolet sterilizing means;

and wherein said microprocessor is arranged to process an output indicative of the differential pressure across said polishing filter means, and an output indicative of the amount of ultraviolet light applied by said ultraviolet sterilizing means.

11. A dispensing apparatus according to claim 1, wherein said second purifying means comprises dispensing pump means connected to an outlet of said tank means for pumping water from said tank means, polishing filter means connected to an outlet of said dispensing pump means for filtering said tank water, and an ultraviolet sterilizing means connected to an outlet of said polishing filter means for applying ultraviolet light to destroy microorganisms present in said tank water as it passes from an inlet to an outlet of said sterilizing means.

12. A dispensing apparatus according to claim 11 further comprising control means which includes:

polishing filter measuring means for measuring a pressure differential across said polishing filter means;

sterilizing measuring means for measuring the amount of ultraviolet light applied to said tank water passing through said ultraviolet sterilizing means; and, microprocessor means for processing outputs from each of said measuring means, each of said outputs permitting said microprocessor means to monitor an operating condition corresponding to the respective measuring means.

13. A dispensing apparatus according to claim 1, wherein said first purifying means comprises:

pump means connected to said supply means for pumping said input water, reverse osmosis filter means for removing dissolved solids from said input water and having an inlet connected to said pump means and an outlet connected to said tank means, inlet conductivity measuring means for measuring the conductivity of water flowing between said pump means and said reverse osmosis filter means, outlet conductivity measuring means for measuring the conductivity of water flowing from the outlet of said reverse osmosis filter means to said tank means, and control means for processing outputs from each of said measuring means, said control means comprising comparator means for comparing said inlet and outlet conductivities to determine a differential therebetween, and microprocessor means for processing said differential to determine the effectiveness of said reverse osmosis filter means in removing said dissolved solids.

14. A dispensing apparatus according to claim 1 further comprising:

first water level sensing means for sensing a first water level in said tank means, second water level sensing means for sensing a second water level in said tank means greater than said first water level, third water level sensing means for sensing a third water level in said tank means greater than said second water level, and control means for processing outputs from each of said sensing means, the outputs from said first and second sensing means permitting said control means to determine when an amount of dispensed water needs to be replaced in said tank means, and the outputs from said third sensing means permitting said control means to determine when said dispensing apparatus should be shut down due to an abnormally high water level condition in said tank means.

15. A dispensing apparatus according to claim 1 further comprising:

first water level sensing means for sensing a first water level in said tank means, second water level sensing means for sensing a second water level in said tank means greater than said first water level, a third water level sensing means for sensing a third water level in said tank means less than said first water level, and control means for processing outputs from each of said sensing means, the outputs from said first and second sensing means permitting said control means to determine when said tank means should be refilled under normal operating conditions, and the outputs from said first and third sensing means permitting said control means to determine the amount of water to be dispensed from said tank means for purging said second purifying means and said dispensing means.

16. A dispensing apparatus according to claim 1 further comprising:

a first water level sensing means for sensing a first water level in said tank means, a second water level sensing means for sensing a second water level in said tank means greater than said first water level, and control means for processing outputs from each of said sensing means to determine when a bulk amount of water dispensed from said tank means by said dispensing means is to be replaced by first purified water from said first purifying means, said bulk amount of water exceeding by a multiple a user selected quantity of second purified water dispensable to the container by said dispensing means.

* * * * *